US008147053B2

(12) United States Patent
Kawakami et al.

(10) Patent No.: US 8,147,053 B2

(45) Date of Patent: Apr. 3, 2012

(54) INK-JET RECORDING APPARATUS AND INK-JET RECORDING METHOD

(75) Inventors: Hiroshi Kawakami, Shizuoka-ken (JP); Wataru Ono, Shizuoka-ken (JP); Kazuo Sanada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 435 days.

(21) Appl. No.: 12/535,692

(22) Filed: Aug. 5, 2009

(65) Prior Publication Data

US 2010/0045760 A1 Feb. 25, 2010

(30) Foreign Application Priority Data

Aug. 19, 2008 (JP) ................................. 2008-210923

(51) Int. Cl.
*G01D 11/00* (2006.01)

(52) U.S. Cl. ........................................ 347/100; 347/102

(58) Field of Classification Search .................. 347/100, 347/102; 428/32.1, 32.34
See application file for complete search history.

(56) References Cited

U.S. PATENT DOCUMENTS

2010/0231670 A1* 9/2010 Arai et al. .................... 347/100

FOREIGN PATENT DOCUMENTS

| | | | |
|---|---|---|---|
| JP | 9-202042 A | | 8/1997 |
| JP | 2004-188704 A | | 7/2004 |
| JP | 2005-297535 A | | 10/2005 |
| JP | 2005281523 A | * | 10/2005 |
| JP | 2006-111016 A | | 4/2006 |

* cited by examiner

*Primary Examiner* — Ellen Kim

(74) *Attorney, Agent, or Firm* — SOLARIS Intellectual Property Group, PLLC

(57) ABSTRACT

The present invention provides an ink-jet recording apparatus having a driving roll 17*a* and press-contact rolls 17*b* and 17*c* that transport an ink-jet recording medium 13, an ink-jet head 11 ejecting an ink onto the transported ink-jet recording medium 13, and a drying device drying the ink ejected from the ink-jet head 11, providing images in which density is high and hue difference (color change) is prevented from being developed, and an ink-jet recording method using the ink-jet recording apparatus.

17 Claims, 1 Drawing Sheet

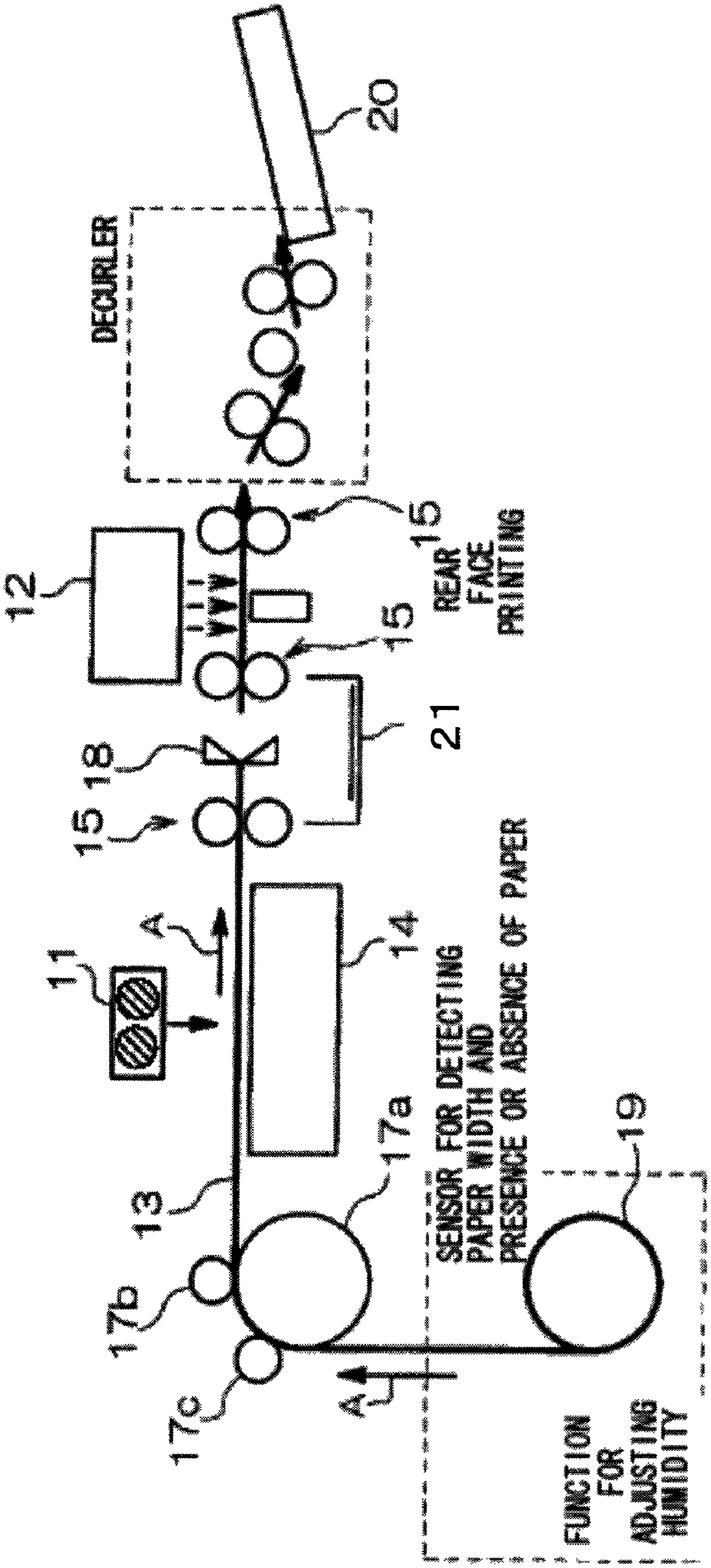
DECURLER
20
12
15
15
15
REAR FACE PRINTING
21
18
11
A
A
14
13
17a
17b
17c
19
SENSOR FOR DETECTING PAPER WIDTH AND PRESENCE OR ABSENCE OF PAPER
FUNCTION FOR ADJUSTING HUMIDITY

INK-JET RECORDING APPARATUS AND INK-JET RECORDING METHOD

CROSS-REFERENCE TO RELATED APPLICATION

This application claims priority under 35 USC 119 from Japanese Patent Application No. 2008-210923 filed on Aug. 19, 2008, the disclosure of which is incorporated by reference herein.

BACKGROUND OF THE INVENTION

1. Field of the Invention

The present invention relates to an ink-jet recording apparatus for recording images by an ink-jet method, and to an ink-jet recording method.

2. Description of the Related Art

As an image recording method for recording color images, various methods have been proposed in recent years, and in all of the methods, demands with respect to qualities of recorded products such as image quality, texture and curl after recording are high.

For instance, as an ink-jet recording method, a method using an ink-jet recording medium that has an ink receiving recording layer with a porous structure has been put to practical use. As one example thereof, there is an ink-jet recording medium in which a recording layer that contains inorganic pigment particles and a water-soluble binder and has a high porosity is provided on a support. Owing to the porous structure, the medium has excellent quick-drying performance and high luster and is capable of recording photograph-like images.

Ink-jet technology has been employed in fields such as office printers and home printers, and, in recent years, has been extending into the field of commercial printing. For instance, there have been demands for applications such as printing images at high speed (high-speed printing) or printing a large number of copies at a time (high-volume printing), or for recording images on both sides (double-sided recording) in commercial prints such as photo books. In these applications, when images are recorded by jetting inks, not only is the recording of high quality and highly lustrous images at high speed demanded, but also stable density and hue of the recorded images are demanded, from the viewpoint of quality as a recording material.

Under such circumstances in which improvement in quality and performance is proceeding, the influence of ambient humidity or drying conditions on image quality after recording cannot be ignored when double-sided recording, high-volume printing, high-speed printing or the like is performed.

As a technology related to the above, a technology is disclosed (for instance, see Japanese Patent Application Laid-Open (JP-A) No. 9-202042), in which a cationic resin is adhered onto a plain paper sheet that has a support serving as an ink receiving layer, and recording is performed using a high-speed rotary ink-jet printing system having, as an auxiliary drying device, an induction heating device such as a high-frequency heating device or a microwave heating device. Further, there is also disclosure regarding carrying out heat treatment after an image is recorded (for instance, see JP-A Nos. 2004-188704, 2005-297535, and 2006-111016).

SUMMARY

According to the invention, there is provided an ink-jet recording apparatus and an ink-jet recording method capable of providing images in which color density is high and difference in hue (color change) is suppressed. More specifically, according to an aspect of the invention, an ink-jet recording apparatus, including: a transporting device transporting an ink-jet recording medium having on a support an ink receiving layer that comprises inorganic fine particles, a water-soluble resin, and a crosslinking agent; an ink ejection device ejecting onto the ink recording medium an ink that comprises a dye, water, and a water-soluble organic solvent, the water-soluble organic solvent having a rate of change in micropore median size of 13.0% or less in the ink receiving layer as measured by the mercury intrusion method before and after the ink is applied onto the ink receiving layer in an amount of 6.6 $g/m^2$ and being contained in a ratio of at least 40% by mass with respect to an entire amount of water-soluble organic solvent; and a drying device drying at least the ink on the ink-jet recording medium, and an ink-j et recording method using the ink-jet recording apparatus, are provided.

BRIEF DESCRIPTION OF THE DRAWING

Exemplary embodiments of the present invention will be described in detail based on the following figure, wherein:

FIG. 1 is a schematic diagram showing the entire structure of an ink-jet printer according to an exemplary embodiment of the present invention.

DETAILED DESCRIPTION

Exemplary embodiments of the invention are described in detail hereinafter.

The inventors found that, for instance, in the case of double-sided printing, high-volume printing, or high-speed printing, at the time when printed articles are retrieved and stacked in a short time after recording, if drying is not sufficient after recording, difference in hue (color change) is easily developed in printed images between portions having overlap and portions not having overlap.

In the case of an ink-jet recording medium having an ink receiving layer that is formed in a porous structure by incorporating inorganic fine particles therein, the size of micropores in the porous structure becomes small when the medium receives ink drops. Whereby, the medium is likely to become difficult to be dried. Because of this, in the case of double-sided printing in which recorded faces are stacked together immediately after recording or in the case such as high-speed printing in which recording is performed under a condition that easily causes incomplete drying, color change is developed in the same image or between different images. Whereby, images with stable hue are hardly provided.

The present invention has been made in view of the above circumstances. It is an object of the present invention to provide an ink-jet recording apparatus and an ink-jet recording method capable of providing images in which color density is high and difference in hue (color change) is suppressed.

The present invention has been accomplished based on such finding that a property of an ink used for recording, that is, a poor compatibility of the ink with respect to an ink receiving layer that serves as a medium to be recorded, suppresses the reduction of the micropore size in the porous structure after recording and consequently effectively suppresses the color change that is easily developed immediately after recording.

The inventors studied hard and found that the foregoing objects are achieved by the followings.

An ink-jet recording apparatus according to a first aspect of the present invention includes: a transporting device transporting an ink-jet recording medium having on a support an ink receiving layer that contains inorganic fine particles, a water-soluble resin, and a crosslinking agent; an ink ejection device ejecting onto the ink-jet recording medium an ink that contains a dye, water, and a water-soluble organic solvent; and a drying device drying at least the ink on the ink-jet recording medium, and uses, as an ink-jet recording ink that is ejected by the ink ejection device, an ink (hereinafter, also referred to as "specific ink") that contains a dye, water, and a water-soluble organic solvent, the water-soluble organic solvent having a rate of change in micropore median size of 13.0% or less in the ink receiving layer as measured by the mercury intrusion method before and after the ink is applied in an amount of 6.6 $mg/m^2$ onto the ink receiving layer of the ink-jet recording medium and being contained in a ratio of at least 40% by mass with respect to an entire amount of water-soluble organic solvent.

The ink-jet recording apparatus according to the first aspect of the present invention may further include, if necessary, additional devices such as a retrieve device that retrieves an ink-jet recording medium having images recorded thereon after ink ejection and drying.

Because the specific ink that has a poor compatibility with the ink receiving layer of the ink-jet recording medium that serves as a medium to be recorded is used and the resulting image recorded with the specific ink is dried, the size of micropores in the porous structure is prevented from being reduced at the time when ink drops are received, and the ink drops are allowed to be dried more easily with the same quantity of heat energy as compared with conventional methods. Whereby, the ink-jet recording apparatus according to the first aspect of the present invention has a capability of suppressing effectively color change in images that easily develops immediately after recording while the ink receiving layer suffers from no damages. Owing to this, even in a processing system including double-sided printing, high-volume printing, or high-speed printing where printed images are covered by being stacked or the like within a short time after recording, high quality images having stable image hue are attainable.

The drying device that is included in the ink-jet recording apparatus according to the first aspect of the present invention may have a configuration of having an infrared ray irradiation unit that irradiates infrared rays or a microwave irradiation unit that irradiates microwaves and heating at least the ink ejected onto the ink-jet recording medium with infrared rays or microwaves.

The ink receiving layer in the image portions recorded with the specific ink of the present invention may be easily dried while the consumption of heat energy is saved, because the size of micropores in the porous structure is prevented from being decreased and the layer is kept to be easily dried, in particular, the image portions, that is, the ink drops received therein or the liquid components contained in the ink receiving layer may be directly heated with infrared rays or microwaves. In addition, in the infrared ray heating or microwave heating, as opposed to the drying method using only warm or hot air, the recorded face of the ink receiving layer is not unnecessarily heated and the influences of the air hardly extend to the vicinity of ink-jet heads, so that qualities of resulting images including image hue hardly suffers from adverse effects.

In the first aspect of the present invention, as a water-soluble organic solvent contained in the ink, at least one selected from ethylene glycol monoalkyl ether, diethylene glycol monoalkyl ether, propylene glycol monoalkyl ether, dipropylene glycol monoalkyl ether, alkanediol, ethylene glycol dialkyl ether, diethylene glycol dialkyl ether, triethylene glycol dialkyl ether, propylene glycol dialkyl ether, dipropylene glycol dialkyl ether, and tripropylene glycol dialkyl ether is preferably used.

The ink prepared by using the water-soluble organic solvent selected from the above has a poor compatibility with the ink receiving layer of an ink-jet recording medium, suppressing further the reduction in the micropore size in the porous structure after recording, working particularly effectively on the prevention of color change that is easily developed immediately after recording.

The drying device preferably starts drying within 20 seconds after ink ejection from the ink ejection device is finished. Because recording is performed by using the specific ink, drying may start within 20 seconds after ink ejection. In addition to that, because drying may start within 20 seconds after ink ejection is finished, color change which occurs in images immediately after recording may be effectively prevented.

The ink ejection device according to the first aspect of the present invention ejects the ink preferably at a maximum total ejection amount of from 10 $mL/m^2$ to 36 $mL/m^2$ when images are recorded. Even in such a relatively high total ejection amount range of from 10 $mL/m^2$ to 36 $mL/m^2$, color change which occurs in images immediately after recording may be prevented, so that stable image recording is attainable, for instance, in a processing system where images are stacked within a short time including high-speed printing, high-volume printing, and double-sided printing.

The drying device has a capability of performing drying at a heat quantity of 2 kJ or less per 102 mm×105 mm (in a KG size). According to the configuration of the first aspect of the present invention, drying by heating while saving the consumption of heat energy is allowed, and stable images are attainable with a relatively low consumption of heat energy of 2 kJ or less per KG size, further 1 kJ or less per KG size.

An ink-jet recording method according to a second aspect of the present invention includes a transporting step of transporting an ink-jet recording medium having on a support an ink receiving layer that contains inorganic fine particles, a water-soluble resin, and a crosslinking agent; an ink ejection step of ejecting an ink, by an ink-jet method, onto the ink-jet recording medium transported in the transporting step; and a drying step of drying at least the ink on the ink-jet recording medium. As the ink-jet recording ink that is ejected by using the ink-jet method in the ink ejection step, similarly to the first aspect of the present invention, an ink (specific ink) that contains a dye, water, and a water-soluble organic solvent is used; the water-soluble organic solvent has a rate of change in micropore median size of 13.0% or less in the ink receiving layer as measured by the mercury intrusion method before and after the ink is applied in an amount of 6.6 $mg/m^2$ onto the ink receiving layer of the ink-jet recording medium at least 40% by mass with respect to an entire amount of water-soluble organic solvent.

The ink-jet recording method according to the second aspect of the present invention may be configured by further including, if necessary, additional steps such as a retrieve step of retrieving an ink-jet recording medium having images recorded thereon after the ink ejection and drying steps.

Also in the ink-jet recording method according to the second aspect of the present invention, similarly to the first aspect of the present invention, because the specific ink that has poor compatibility with the ink receiving layer of the ink-jet recording medium that serves as a medium to be recorded is used and the resulting image recorded with the specific ink is dried, the size of micropores in the porous structure is prevented from being reduced at the time when ink drops are received, and the ink drops are allowed to be dried more easily with the same quantity of heat energy as compared with conventional methods. Whereby, color change in images that easily develops immediately after recording may be effectively prevented while the ink receiving layer suffers from no damages. Owing to this, even in a processing system including double-sided printing, high-volume printing, and high-speed printing where printed images are covered by being stacked or the like within a short time after recording, high quality images having stable colors are attainable.

The drying device in the second aspect of the present invention has a capability of performing drying at a heat quantity of 2 kJ or less per 102 mm×105 mm (in a KG size). According to the configuration of the second aspect of the present invention, drying by heating while saving the consumption of heat energy is allowed and stable images are attainable with a relatively low consumption of heat energy of 2 kJ or less per KG size, further 1 kJ or less per KG size.

In the drying step of the second aspect of the present invention, at least the ink ejected onto the ink-jet recording medium may be dried by infrared ray heating or microwave heating.

The ink receiving layer in the image portions recorded with the specific ink of the present invention may be easily dried while the consumption of heat energy is saved, because the size of micropores in the porous structure is prevented from being decreased and the layer is kept to be easily dried, in particular, the image portions, that is, the ink drops received therein or the liquid components contained in the ink receiving layer may be directly heated with infrared rays or microwaves. In addition, in the infrared ray heating or microwave heating, as opposed to the drying method using only warm or hot air, the recorded face of the ink receiving layer is not unnecessarily heated and the influences of the air hardly extends to the vicinity of ink-jet heads, so that qualities of resulting images including image hue hardly suffers from adverse effects.

In the drying step, drying preferably starts within 20 seconds after ink ejection from the ink ejection device is finished. Because recording is performed by using the specific ink, drying may start within 20 seconds after ink ejection. In addition to that, because drying may start within 20 seconds after ink ejection is finished, color change which occurs in images immediately after recording is effectively prevented.

In the ink ejection step according to the second aspect of the present invention, the ink is ejected preferably at a maximum total ejection amount of from 10 $mL/m^2$ to 36 $mL/m^2$ when images are recorded. Even in such a relatively high total ejection amount range of from 10 $mL/m^2$ to 36 $mL/m^2$, color change which occurs in images immediately after recording may be prevented, so that stable image recording is attainable, for instance, in a recording process where images are stacked within a short time including high-speed printing, high-volume printing, and double-sided printing.

In the second aspect of the present invention, as a water-soluble organic solvent contained in the ink, at least one selected from the group consisting of ethylene glycol monoalkyl ether, diethylene glycol monoalkyl ether, propylene glycol monoalkyl ether, dipropylene glycol monoalkyl ether, alkanediol, ethylene glycol dialkyl ether, diethylene glycol dialkyl ether, triethylene glycol dialkyl ether, propylene glycol dialkyl ether, dipropylene glycol dialkyl ether, and tripropylene glycol dialkyl ether is preferably used.

The ink prepared by using the water-soluble organic solvent selected from the above has a poor compatibility with the ink receiving layer of an ink-jet recording medium, suppressing the reduction in the micropore size in the porous structure after recording, working particularly effectively on the prevention of color change that is easily developed immediately after recording.

The ink is preferably a dye-based ink that contains a dye as a colorant. When the dye-based ink is used, a large effect of suppressing color change that is developed immediately after recording may be obtained, particularly.

An exemplary embodiment of the ink-jet recording apparatus according to the present invention will be described in detail with reference to the accompanied FIG. 1. Also, through this description, the details of the ink-jet recording method according to the present invention will be concretely described.

The ink-jet recording apparatus of the exemplary embodiment includes, as shown in FIG. 1, an ink-jet head (ink ejection device) 11 ejecting an ink-jet ink (hereinafter, also simply referred to as "ink") and a drying device 12 that dries the ink ejected from the ink-jet head. When an ink is ejected from the ink-jet head 11, the ejected ink is spotted onto an ink-jet recording medium to record images; the images are transported together with the ink-jet recording medium to the drying device 12, in which the images are dried.

The ink-jet head 11 is a serial type shuttle head that serves for recording while it moves a short shuttle head back and forth within the maximum recording width of images to be recorded in the width direction of the images (in a direction perpendicular to the transporting direction in the transporting face of the recording medium). Certain number of ink tanks that keep inks therein, not shown in the figure, corresponding to the number of hue used, are connected to the ink-jet head, so that the inks are supplied to the ink-jet head in accordance with images to be recorded.

In the present invention, any recording system including a serial type recording system and a system allowing relatively high-speed recording, for example, a system allowing recording by ejecting in a main scanning direction in a single-pass mode in which one line is formed by single scanning, may be employed. Besides the recording systems using the shuttle head, in another recording system, a full-line head having a number of ejection holes (nozzles) may be used in a single-pass mode. This system allows high-speed image recording on a recording medium. In the present invention, high quality images in which color density is high and the development of difference in hue (color change) is suppressed are attainable even in the case where high-speed printing or high-volume printing is performed in a system using the single-pass mode.

There is not any particular limitation on the ink-jet process, but may be selected from any known methods including: a charge control system in which an ink is ejected by using an electrostatic attraction force; a drop-on-demand method (pressure pulse method) in which a vibration pressure of a piezo element is used; an acoustic ink-jet method in which an electric signal is transformed into an acoustic beam and an ink is irradiated with the acoustic beam so as to be ejected by using a radiation pressure; and a thermal ink-jet (Bubble Jet (registered trade name)) method in which an ink is heated to form bubbles and resulting pressure is used. As the ink-jet method, particularly, an ink-jet method described in JP-A No. 54-59936 is effectively used, in which an ink received an action of thermal energy produces an abrupt volume change and the ink is ejected by a force resulting from this change.

Note that, the foregoing ink-jet method may include: a method in which a number of small volumes of a low-concentration ink called as a photo-ink are ejected; a method in which image qualities are improved by using plural inks having substantially the same hue but different concentrations; and a method in which a colorless transparent ink is used.

The ink-jet head used in the ink-jet method may be an on-demand system or a continuous system. Further, specific examples of the ejection method may include: an electromechanical transduction method (for instance, single cavity type, double cavity type, bender type, piston type, share mode type, shared wall type, or the like); an electrothermal transduction method (for instance, thermal ink-jet type, Bubble Jet (registered trade name) type, or the like); an electrostatic attraction method (for instance, charge control type, slit jet type, and or like); and a discharge method (for instance, spark jet type or the like), but any ejection method is usable.

Note that, there is not any particular limitation on the ink nozzles or the like that are used for recording in the foregoing ink-jet method, but the ink nozzles may be selected appropriately in accordance with purposes.

For the ink-jet head, besides the shuttle process in which a short serial head is used and recording is performed by scanning the head in the width direction of a recording medium, a line process using a line head in which recording elements are lined to cover the entire range of one side of a recording medium may be used. In the line process, images may be recorded on the whole face of a recording medium by scanning the recording medium in a direction perpendicular to the lined direction of the recording element. In addition, only the recording medium is moved, so that recording may be performed at a higher speed as compared with the shuttle process.

The amount of ink drops ejected from the ink-jet head is preferably from 0.2 pL to 10 pL (picolitter), and more preferably from 0.4 pL ot 5 pL from the viewpoints of having a large effect of reducing the load of drying and preventing effectively color change.

The maximum total ejection amount of ink when images are recorded is preferably in the range of from 10 $mL/m^2$ to 36 $mL/m^2$, and more preferably from 15 $mL/m^2$ to 30 $mL/m^2$, from the viewpoints of having a large effect of reducing the load of drying and preventing effectively color change.

Here, the maximum total ejection amount ($mL/m^2$) is a maximum amount of the total amount of the ejection amount of each ink per unit area of an apparatus used and is obtained by the following equation.

Maximum total ejection amount=Maximum ejection amount of one dot ($mL/m^2$)×Total amount of inks (%), (Total amount of inks: the total of actual ejection amount (a %) of each ink, which is allocated from the predetermined ejection amount (A %) of each ink, Y (Yellow), M (Magenta), C (Cyan), and K (Black)).

For instance, the total amount of inks is, when the predetermined amount (A %) for the four colors of Y, M, C and K is 100% respectively (the maximum predetermined amount for the four colors is 400% at maximum), and the actual ejection amount (a %) is, for instance, Y=M=C=K=30% in the case of recording a gray image, the total amount of inks becomes 120%. The maximum total ejection amount is calculated to be 20×1.2=24 $mL/m^2$ when the maximum ejection amount for one dot is selected to be 20 $mL/m^2$.

As the ink-jet ink, an ink that contains a dye, water, and a water-soluble organic solvent is used. The water-soluble organic solvent has a rate of change in the micropore median size of 13.0% or less in an ink receiving layer as measured by the mercury intrusion method before and after an ink is applied in an amount of 6.6 $mg/m^2$ onto the ink receiving layer of an ink-jet recording medium and is contained in a ratio of at least 40% by mass with respect to an entire amount of water-soluble organic solvent.

The ink has a property of exhibiting a poor compatibility with an ink receiving layer that has a porous structure, thereby preventing the reduction of the micropore size in the porous structure that occurs due to receiving ink drops for recording.

Ink-jet Ink

An ink-jet ink is described.

The ink-jet ink (hereinafter, also referred to as "ink" simply) contains at least a dye, water, and a water-soluble organic solvent. As the water-soluble organic solvent, a solvent (hereinafter, also referred to as "specific water-soluble organic solvent") that is characterized by having a rate of change in the micropore median size of 13.0% or less in an ink receiving layer as measured by the mercury intrusion method, that is described later, before and after an ink is applied in an amount of 6.6 $mg/m^2$ onto the ink receiving layer is contained in a ratio of at least 40% by mass with respect to an entire amount of water-soluble organic solvent. Further, the ink preferably contains a colorant such as pigments or dyes, and may contain, if necessary, additional components such as a surfactant.

The ink may be at least one kind selected from the group consisting of a yellow ink, a magenta ink, a cyan ink, and a black ink, or may be provided as an ink set that is a combination of these inks.

Water-Soluble Organic Solvent

The ink contains at least one water-soluble organic solvent (specific water-soluble organic solvent) that is characterized by having a rate of change in the micropore median size of 13.0% or less in an ink receiving layer as measured by the mercury intrusion method after the ink is applied in an amount of 6.6 $g/m^2$ onto the ink receiving layer of an ink-jet recording medium.

The "mercury intrusion method" uses the mercury property of having a large surface tension and is characterized in that pressure is applied so as to intrude mercury into the micropores of powders and the specific surface area or micropore size distribution is estimated from the pressure applied and the amount of mercury intruded. The size and volume of micropores in the surface of a test sample may be evaluated by monitoring the change in the liquid level of mercury (that is, the amount of mercury intruded into the micropores) while the pressure applied is continuously increased.

The median size of the voids in an ink receiving layer that is evaluated by the mercury intrusion method has the same meaning as the capillary diameter that is involved in the basic equation of liquid penetration (Lucas-washburn equation) represented by the following equation 1. When the median size is increased, the ink absorption time becomes shorter.

$$t=(2h^2\times\eta)/(\gamma\times d\times\cos\theta) \quad \text{Equation 1}$$

t: penetration time
h: liquid penetration depth
$\eta$: liquid viscosity
$\gamma$: liquid surface tension
d: capillary diameter
$\theta$: liquid contact angle The rate of change in the micropore median size before and after recording is influenced by a water-soluble organic solvent contained in an ink used for recording, and the change may be evaluated by using an aqueous solution diluted with water. Therefore, the measurement of micropore median size before and after recording is performed by using a test sample in which an aqueous solution obtained by diluting a water-soluble organic solvent with water is applied to an ink receiving layer.

Upon measurement by the mercury intrusion method, the water-soluble organic solvent is applied in an amount of preferably from 5 $g/cm^2$ to 8 $g/cm^2$, considering image density or color change (hue difference) that develops immediately after recording. In the present invention, the applied amount of the water-soluble organic solvent is selected to be 6.6 $g/m^2$. In order to adjust the applied amount of the water-soluble organic solvent at the above value, the water-soluble organic solvent may be diluted with water into a concentration of from 15% by mass to 40% by mass.

In the mercury intrusion measurement, drying is insufficient at the time immediately after the water-soluble organic solvent (including water) is applied to the ink receiving layer, so that the measurement is performed after 24 hour leaving in an atmosphere at 25° C. and 50% RH. It is sufficient that the leaving time is 24 hours or more.

The micropore median size of the ink receiving layer before the water-soluble organic solvent is applied is given by the value of micropore diameter that is measured by the mercury intrusion method on the ink receiving layer before the water-soluble organic solvent is applied onto the ink receiving layer. The micropore median size of the ink receiving layer after the water-soluble organic solvent is applied is given by the value of micropore diameter measured by the mercury intrusion method after the water-soluble organic solvent is applied in an amount of 6.6 $g/m^2$ onto the ink receiving layer and left for 24 hours.

The micropore median size of the ink receiving layer before recording is preferably from 5 nm to 40 nm, more preferably from 8 nm to 35 nm, and even more preferably from 10 nm to 30 nm, from the viewpoint of obtaining images in which color density is high and color change is suppressed while bronzing is not worsened.

The ink of the present invention is prepared by using the specific water-soluble organic solvent having a rate of change in the micropore median size of from 0% to 13.0% in an ink receiving layer before and after application as measured by the mercury intrusion method. From the viewpoint of preventing color change, the rate of change in the micropore median size is preferably from 0% to 10%, more preferably from 0% to 7%, and even more preferably from 0% to 5%.

In this way, by using the specific water-soluble organic solvent having the rate of change within the above range in the micropore median size before and after recording, images having a high image density and a small color change immediately after recording may be obtained.

The method for measuring the micropore median size of an ink receiving layer as measured by the mercury intrusion method is described specifically as follows.

The specific water-soluble organic solvent is diluted with water and is coated with a coating machine on an ink receiving layer of an ink-jet recording medium in a coating amount of 6.6 $g/m^2$. Then, an ink-jet recording medium after coating and another ink-jet recording medium before coating are left for 24 hours in an atmosphere at 25° C. and 50% RH. After that, the micropore size distribution (L2: micropore median size before coating, L3: micropore median size after coating) is measured at an initial atmospheric pressure of 20 kPa with a "9220" porosimeter manufactured by Shimadzu Autopore Corp. In addition, a support having no ink receiving layer is also subjected to the micropore size distribution measurement, similarly (L1: micropore median size of the support).

Then, from the resulting micropore size distributions of the ink receiving layer and support, in accordance with the following equation, the rate of change (%) in the micropore median size of the ink receiving layer is obtained.

$$\text{Rate of change (\%) in micropore median size of ink receiving layer}=[(L3-L1)/(L2-L1)]\times 100-100$$

Examples of the specific water-soluble organic solvent include alcohols such as methanol, ethanol, propanol, isopropanol, butanol, isobutanol, sec-butanol, t-butanol, pentanol, hexanol, cyclohexanol and benzyl alcohol; polyhydric alcohols such as ethylene glycol, diethylene glycol, triethylene glycol, polyethylene glycol, propylene glycol, dipropylene glycol, polypropylene glycol, butylene glycol, hexanediol, pentanediol, glycerin, hexanetriol and thio glycol; glycol derivatives such as ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether and ethylene glycol monophenyl ether; amines such as ethanolamine, diethanolamine, triethanolamine, N-methyldiethanolamine, N-ethyldiethanolamine, morpholine, N-ethylmorpholine, ethylenediamine, diethylenetriamine, triethylenetetraamine, polyethyleneimine and tetramethylpropylenediamine; and other polar solvents such as formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile and acetone.

Note that, the water-soluble organic solvents may be used alone or in a combination of two or more of them.

When two or more of them are used in combination, the rate of change in the micropore median size is regulated at 13.0% or less when coated in an amount of 6.6 $g/m^2$ as a mixed solution.

As the specific water-soluble organic solvent, among these, at least one selected from alkanediol, ethylene glycol monoalkyl ether, diethylene glycol monoalkyl ether, propylene glycol monoalkyl ether, dipropylene glycol monoalkyl ether, ethylene glycol dialkyl ether, diethylene glycol dialkyl ether, triethylene glycol dialkyl ether, propylene glycol dialkyl ether, dipropylene glycol dialkyl ether, and tripropylene glycol dialkyl ether is preferable. An ink that contains these water-soluble organic solvents in a ratio of at least 40% by mass with respect to an entire amount of water-soluble organic solvent is preferable from the viewpoints of image density and prevention of hue difference (color change).

The ink contains the specific water-soluble organic solvent in a ratio of at least 40% by mass with respect to the total mass of the water-soluble organic solvent contained in the ink. When the content ratio of the specific water-soluble organic solvent is less than 40% by mass, the micropore size of the porous structure is easy to be reduced by receiving ink drops, thereby hardly preventing color change in images immediately after recording. Therefore, high quality images are hardly obtained in the case of recording in a processing mode such as double-sided recording, high-volume recording, or high-speed recording.

The ratio of the specific water-soluble organic solvent with respect to the total mass of the water-soluble organic solvent is preferably in the range of from 60% by mass to 100% by mass, more preferably from 70% by mass to 100% by mass, and particularly preferably from 85% by mass to 100% by mass.

As the alkanediol, the one with an alkylene moiety having from 2 to 6 carbon atoms is preferable, and, from the viewpoint of image density, the one with an alkyl moiety having from 2 or 3 carbon atoms is more preferable. Specific examples thereof may include ethylene glycol and 1,2-propanediol.

As the ethylene glycol monoalkyl ether, diethylene glycol monoalkyl ether, propylene glycol monoalkyl ether, and dipropylene glycol monoalkyl ether, the one with an alkyl moiety having from 1 to 5 carbon atoms is preferable, and from the viewpoint of image density, the one with an alkyl moiety having from 1 to 4 carbon atoms is more preferable.

As the ethylene glycol dialkyl ether, diethylene glycol dialkyl ether, triethylene glycol dialkyl ether, propylene glycol dialkyl ether, dipropylene glycol dialkyl ether, and tripropylene glycol dialkyl ether, from the viewpoint of attaining a high image density without damaging solubility in the ink, the one with an alkyl moiety having from 1 to 3 carbon atoms is preferable, and the one with an alkyl moiety having one carbon atom is more preferable.

Among the specific water-soluble organic solvents, ethylene glycol monomethyl ether, ethylene glycol monoethyl ether, ethylene glycol monobutyl ether, propylene glycol monomethyl ether, propylene glycol monoethyl ether, propylene glycol monobutyl ether, ethylene glycol dimethyl ether, diethylene glycol dimethyl ether, triethylene glycol dimethyl ether, propylene glycol dimethyl ether, dipropylene glycol dimethyl ether, and tripropylene glycol dimethyl ether are particularly preferable.

The total content of the water-soluble organic solvent in the ink is, from the viewpoints of attaining color change prevention and sharp and high-density images, preferably from 3% by mass to 50% by mass, more preferably from 5% by mass to 40% by mass, even more preferably from 5% by mass to 30% by mass, and particularly preferably from 7% by mass to 25% by mass.

(Colorant)

The ink may contain as a coloring component at least one of colorant such as a pigment or a dye.

As the pigment, either an inorganic pigment or an organic pigment may be used. Examples of the inorganic pigment may include not only metal oxides such as titanium oxide or iron oxide but also carbon black produced by known methods including contact process, furnace process, and thermal process. Examples of the organic pigment may include azo dyes (including azo lake, insoluble azo pigment, condensed azo pigment, and chelate azo pigment), polycyclic pigments (including phthalocyanine pigment, perylene pigment, perynone pigment, anthraquinone pigment, quinacridone pigment, dioxazine pigment, thioindigo pigment, isoindolinone pigment, and quinophthalone pigment), dye chelates (including basic dye chelate and acidic dye chelate), nitro pigments, nitroso pigments, and aniline black.

In the present invention, a dye-based ink that contains dyes is preferable considering the luster unevenness in printed portions. As the dyes, conventional dyes usable in ink-jet printing may be used. Examples thereof may include the dyes classified in the color index as acid dyes, direct dyes, reactive dyes, vat dyes, sulfur dyes or food pigments and the dyes classified as oil-soluble dyes or basic dyes.

Examples of the dyes may include azo dyes, azomethine dyes, xanthenes dyes, and quinone dyes.

As the dyes, water-soluble dyes are preferable from the viewpoints of preventing viscosity increase in the ink and forming sharp images. Note that, the water-soluble dyes are the dyes that have a solubility of at least 0.2 g in 100 mL of a water solvent (25° C.).

Specific examples of the dye are shown below. However, the invention is not limited to these examples.

[C.I. Acid Yellow]

C.I. Acid Yellow Nos. 1, 3, 11, 17, 18, 19, 23, 25, 36, 38, 40, 42, 44, 49, 59, 61, 65, 67, 72, 73, 79, 99, 104, 110, 114, 116, 118, 121, 127, 129, 135, 137, 141, 143, 151, 155, 158, 159, 169, 176, 184, 193, 200, 204, 207, 215, 219, 220, 230, 232, 235, 241, 242, and 246.

[C.I. Acid Orange]

C.I. Acid Orange Nos. 3, 7, 8, 10, 19, 24, 51, 56, 67, 74, 80, 86, 87, 88, 89, 94, 95, 107, 108, 116, 122, 127, 140, 142, 144, 149, 152, 156, 162, 166, and 168.

[C.I. Acid Red]

C.I. Acid Red Nos. 1, 6, 8, 9, 13, 18, 27, 35, 37, 52, 54, 57, 73, 88, 97, 106, 111, 114, 118, 119, 127, 131, 138, 143, 145, 151, 183, 195, 198, 211, 215, 217, 225, 226, 249, 251, 254, 256, 257, 260, 261, 265, 266, 274, 276, 277, 289, 296, 299, 315, 318, 336, 337, 357, 359, 361, 362, 364, 366, 399, 407, and 415.

[C.I. Acid Violet]

C.I. Acid Violet Nos. 17, 19, 21, 42, 43, 47, 48, 49, 54, 66, 78, 90, 97, 102, 109 and 126.

[C.I. Acid Blue]

C.I. Acid Blue Nos. 1, 7, 9, 15, 23, 25, 40, 62, 72, 74, 80, 83, 90, 92, 103, 104, 112, 113, 114, 120, 127, 128, 129, 138, 140, 142, 156, 158, 171, 182, 185, 193, 199, 201, 203, 204, 205, 207, 209, 220, 221, 224, 225, 229, 230, 239, 249, 258, 260, 264, 278, 279, 280, 284, 290, 296, 298, 300, 317, 324, 333, 335, 338, 342 and 350.

[C.I. Acid Green]

C.I. Acid Green Nos. 9, 12, 16, 19, 20, 25, 27, 28, 40, 43, 56, 73, 81, 84, 104, 108 and 109.

[C.I. Acid Brown]

C.I. Acid Brown Nos. 2, 4, 13, 14, 19, 28, 44, 123, 224, 226, 227, 248, 282, 283, 289, 294, 297, 289, 301, 355, 357, and 413.

[C.I. Acid Black]

C.I. Acid Black Nos. 1, 2, 3, 24, 26, 31, 50, 52, 58, 60, 63, 107, 109, 112, 119, 132, 140, 155, 172, 187, 188, 194, 207 and 222.

[C.I. Direct Yellow]

C.I. Direct Yellow Nos. 8, 9, 10, 11, 12, 22, 27, 28, 39, 44, 50, 58, 79, 86, 87, 98, 105, 106, 130, 132, 137, 142, 147 and 153.

[C.I. Direct Orange]

C.I. Direct Orange Nos. 6, 26, 27, 34, 39, 40, 46, 102, 105, 107 and 118.

[C.I. Direct Red]

C.I. Direct Red Nos. 2, 4, 9, 23, 24, 31, 54, 62, 69, 79, 80, 81, 83, 84, 89, 95, 212, 224, 225, 226, 227, 239, 242, 243 and 254.

[C.I. Direct Violet]

C.I. Direct Violet Nos. 9, 35, 51, 66, 94 and 95.

[C.I. Direct Blue]

C.I. Direct Blue Nos. 1, 15, 71, 76, 77, 78, 80, 86, 87, 90, 98, 106, 108, 160, 168, 189, 192, 193, 199, 200, 201, 202, 203, 218, 225, 229, 237, 244, 248, 251, 270, 273, 274, 290 and 291.

[C.I. Direct Green]

C.I. Direct Green Nos. 26, 28, 59, 80 and 85.

[C.I. Direct Brown]

C.I. Direct Brown Nos. 44, 106, 115, 195, 209, 210, 222 and 223.

[C.I. Direct Black]

C.I. Direct Black Nos. 17, 19, 22, 32, 51, 62, 108, 112, 113, 117, 118, 132, 146, 154, 159 and 169.

[C.I. Basic Yellow]

C.I. Basic Yellow Nos. 1, 2, 11, 13, 15, 19, 21, 28, 29, 32, 36, 40, 41, 45, 51, 63, 67, 70, 73 and 91.

[C.I. Basic Orange]

C.I. Basic Orange Nos. 2, 21 and 22.

[C.I. Basic Red]

C.I. Basic Red Nos. 1,2, 12, 13, 14, 15, 18, 23, 24, 27, 29, 35, 36, 39, 46, 51, 52, 69, 70, 73, 82 and 109.

[C.I. Basic Violet]

C.I. Basic Violet Nos. 1, 3, 7, 10, 11, 15, 16, 21, 27 and 39.

[C.I. Basic Blue]

C.I. Basic Blue Nos. 1, 3, 7, 9, 21, 22, 26, 41, 45, 47, 52, 54, 65, 69, 75, 77, 92, 100, 105, 117, 124, 129, 147 and 151.

[C.I. Basic Green]

C.I. Basic Green Nos. 1 and 4.

[C.I. Basic Brown]

C.I. Basic Brown No. 1.

[C.I. Reactive Yellow]

C.I. Reactive Yellow Nos. 2, 3, 7, 15, 17, 18, 22, 23, 24, 25, 27, 37, 39, 42, 57, 69, 76, 81, 84, 85, 86, 87, 92, 95, 102, 105, 111, 125, 135, 136, 137, 142, 143, 145, 151, 160, 161, 165, 167, 168, 175 and 176.

[C.I. Reactive Orange]

C.I. Reactive Orange Nos. 1, 4, 5, 7, 11, 12, 13, 15, 16, 20, 30, 35, 56, 64, 67, 69, 70, 72, 74, 82, 84, 86, 87, 91, 92, 93, 95, and 107.

[C.I. Reactive Red]

C.I. Reactive Red Nos. 2, 3, 5, 8, 11, 21, 22, 23, 24, 28, 29, 31, 33, 35, 43, 45, 49, 55, 56, 58, 65, 66, 78, 83, 84, 106, 111, 112, 113, 114, 116, 120, 123, 124, 128, 130, 136, 141, 147, 158, 159, 171, 174, 180, 183, 184, 187, 190, 193, 194, 195, 198, 218, 220, 222, 223, 228 and 235.

[C.I. Reactive Violet]

C.I. Reactive Violet Nos. 1, 2, 4, 5, 6, 22, 23, 33, 36 and 38.

[C.I. Reactive Blue]

C.I. Reactive Blue Nos. 2, 3, 4, 5, 7, 13, 14, 15, 19, 21, 25, 27, 28, 29, 38, 39, 41, 49, 50, 52, 63, 69, 71, 72, 77, 79, 89, 104, 109, 112, 113, 114, 116, 119, 120, 122, 137, 140, 143, 147, 160, 161, 162, 163, 168, 171, 176, 182, 184, 191, 194, 195, 198, 203, 204, 207, 209, 211, 214, 220, 221, 222, 231, 235 and 236.

[C.I. Reactive Green]

C.I. Reactive Green Nos. 8, 12, 15, 19 and 21.

[C.I. Reactive Brown]

C.I. Reactive Brown Nos. 2, 7, 9, 10, 11, 17, 18, 19, 21, 23, 31, 37, 43 and 46.

[C.I. Reactive Black]

C.I. Reactive Black Nos. 5, 8, 13, 14, 31, 34 and 39.

[C.I. Food Black]

C.I. Food Black Nos. 1 and 2.

As a magenta dye, a cyan dye, a black dye, and a yellow dye usable for the ink-jet ink according to the invention, the following dyes are also suitable.

More specifically, examples of the magenta dye usable for the ink-jet ink according to the invention include aryl or heteryl azo dyes having, for example, phenols, naphthols, or anilines, as a coupler component; azomethine dyes having, for example, pyrazolones or pyrazolotriazoles, as a coupler component; methine dyes, such as an arylidene dye, a styryl dye, a merocyanine dye, a cyanine dye, or an oxonol dye; carbonium dyes, such as a diphenylmethane dye, a triphenylmethane dye, or a xanthene dye; quinone dyes, such as naphthoquinone, anthraquinone, or anthrapyridone; and condensed polycyclic dyes, such as a dioxazine dye, but are not limited thereto.

As the magenta dye, a heterocyclic azo dye is preferable, and the dyes include described in International Patent Publication Nos. 2002/83795 (p.p. 35 to 55) and 2002-83662 (p.p. 27 to 42) and JP-A Nos. 2004-149560 (Paragraphs [0046] to [0059]), and 2004-149561 (Paragraphs [0047] to [0060]) are more preferable in view of ozone resistance.

Examples of the cyan dye usable for the ink-jet ink according to the invention include aryl or heteryl azo dyes having, for example, phenols, naphthols, or anilines, as a coupler component; azomethine dyes having, for example, heterocycles, such as phenols, naphthols, or pyrrolotriazole, as a coupler component; polymethine dyes, such as a cyanine dye, an oxonol dye, or a merocyanine dye; carbonium dyes, such as a diphenylmethane dye, a triphenylmethane dye, or a xanthene dye; a phthalocyanine dye; an anthraquinone dye, and an indigo·thioindigo dye, but are not limited thereto.

As an associative phthalocyanine dye, include substances mentioned in International Application Publication Nos. 2002/60994, 2003/811 and 2003/62324 and JP-A Nos. 2003-213167, 2004-75986, 2004-323605, 2004-315758, 2004-315807, and 2005-179469 are preferable from the viewpoint of ozone resistance.

Examples of the black dyes may include disazo dyes, trisazo dyes, and tetrakisazo dyes. These black dyes may be used in combination with a pigment such as a dispersion of carbon black. In the black dyes, a preferably example that has an excellent ozone resistance is described in detail in JP-A No. 2005-307177.

Examples of the yellow dyes may include substances mentioned in International Patent Publication No. W02005/075573, JP-A Nos. 2004-83903 (Paragraphs [0024] to [0062]), 2003-277661 (Paragraphs [0021] to [0050]), 2003-277262 (Paragraphs [0042] to [0047]), 2003-128953 (Paragraphs [0025] to [0076]), 2003-41160 (Paragraphs [0028] to [0064]), U.S. Application Publication No. US2003-0213405 (Paragraphs [0108]); C.I. Direct Yellow Nos. 8, 9, 11, 12, 27, 28, 29, 33, 35, 39, 41, 44, 50, 53, 59, 68, 86, 87, 93, 95, 96, 98, 100, 106, 108, 109, 110, 130, 132, 142, 144, 161 and 163; C.I. Acid Yellow Nos. 17, 19, 23, 25, 39, 40, 42, 44, 49, 50, 61, 64, 76, 79, 110, 127, 135, 143, 151, 159, 169, 174, 190, 195, 196, 197, 199, 218, 219, 222, and 227; C.I. Reactive Yellow Nos. 2, 3, 13, 14, 15, 17, 18, 23, 24, 25, 26, 27, 29, 35, 37, 41, and 42; C.I. Basic Yellow Nos. 1, 2, 4, 11, 13, 14, 15, 19, 21, 23, 24, 25, 28, 29, 32, 36, 39, and 40. Further, yellow dyes described in JP-A No. 2007-191650 (Paragraphs [0013] to [0112], and [0114] to [0121]) are preferable from the viewpoint of ozone resistance.

The content of the dyes in the ink is preferably from 0.5% by mass to 30% by mass and more preferably from 1.0% by mass to 15% by mass with respect to the total mass of the ink. When the content is 0.5% by mass or more, adequate image density is obtained. When the content is 30% by mass or less, the ink viscosity is prevented from being increased and structural viscosity is prevented from occurring in the viscosity characteristics, thereby attaining an adequate stability for ink ejection from the ink-jet head.

To the ink, in addition to the above components, additional components may be added appropriately, if necessary. As the additional components, the components that are allowed to be incorporated into conventional inks may be included as long as the effect of the present invention is not damaged.

In the present invention, for the ink described above, it is more preferable that the specific water-soluble organic solvent is at least one selected from ethylene glycol monomethyl ether, ethylene glycol monoethyl ether, ethylene glycol monobutyl ether, propylene glycol monomethyl ether, propylene glycol monoethyl ether, propylene glycol monobutyl ether, ethylene glycol dimethyl ether, diethylene glycol dimethyl ether, triethylene glycol dimethyl ether, propylene glycol dimethyl ether, dipropylene glycol dimethyl ether, and tripropylene glycol dimethyl ether, and that the content (%) of the specific water-soluble organic solvent is from 85% by mass to 100% by mass with respect to an entire amount of water-soluble organic solvent.

As shown in FIG. 1, in the ink-jet recording apparatus according to an exemplary embodiment of the present invention, a stage 14 having a suction mechanism not shown in the figure is disposed in the direction of ejecting inks from the ejection nozzle of an ink-jet head 11. An ink-jet recording medium 13 is allowed to move between the stage 14 and the ink-jet head 11.

The suction mechanism may work to fix temporarily on the stage the ink-jet recording medium that is transported to the stage by sucking the surface of the stage, for instance, by vacuuming the inside of the stage. The stage serves to fix temporarily the ink-jet recording medium transported thereto by sucking and adhering and to move it in a horizontal direction at a desired speed, for instance, at a high speed of 10 mm/sec or more, so that the position at which ink drops ejected from the ink-jet head are received is allowed to be selected by this movement.

On the downstream side of the stage 14 in the running direction A along which the ink-jet recording medium 13 moves, plural pairs of rollers 15 are disposed so as to transport the ink-jet recording medium having images recorded thereon from the stage 14 to the drying device 12 after recording.

Between plural pairs of the rollers disposed on the downstream side of the stage 14 in the running direction A of the ink-jet recording medium, a cutter 18 for cutting an ink-jet recording paper which is the ink-jet recording medium, and the drying device 12 are successively disposed toward the running direction A.

The cutter 18 cuts the ink-jet paper having images recorded with the ink ejected from the ink-jet head into a sheet. On the opposite side of the cutter 18 across the running passage of the ink-jet recording medium, as shown in FIG. 1, a paper slip recovery box 21 that recovers paper slips or scraps produced when the ink-jet recording medium is cut is attached.

The drying device 12 is designed to irradiate infrared rays or microwaves to the ink that is received to form images on the ink-jet recording medium 13, so that the ink is directly heated and dried.

The method of irradiating electromagnetic waves such as infrared ray or microwaves, in which liquid components contained in image portions or recording media may be directly heated as opposed to the method of supplying heat from the surface of images or media such as a method of supplying warm or hot air or a method of heating with a heater, is preferable considering that recording quality is prevented from having an adverse effect of spreading heat to the vicinity of the ink-jet heads and that the heat quantity required for drying is reduced, for example. Dielectric heating such as infrared ray heating or microwave heating is particularly preferable.

Dielectric heating is a heating method of evaporating liquid components, in which an object to be heated (for instance, ink images, an ink receiving layer, or an ink-jet recording medium) is put in a high frequency alternating electric field of several MHz to several hundred MHz, so that the temperature of the object is elevated by an action of high frequency waves (electromagnetic waves). A high frequency dielectric heating apparatus or the like is used for dielectric heating. Dielectric heating includes microwave heating and high frequency dielectric heating.

In microwave heating, liquid components are evaporated by generating heat from the inside of an object to be heated through an interaction between microwaves and the object. Microwave heating may be performed by using a microwave generator, for instance. Specific examples thereof may include a microwave drying device as described in Japanese Patent No. 2979393 and a microwave irradiator as described in Japanese Patent No. 3302177 that irradiates microwaves generated by a magnetron.

In infrared ray heating, the energy resonantly-absorbed in an object to be heated induces the motion (vibration) of molecules and the heat generated by friction of the molecules evaporates liquid components. Infrared ray heating may be performed by using a halogen lamp, a ceramic far-infrared ray heater, an ultra-far-infrared ray heater, an infrared ray lamp, or the like.

To the drying device 12, a heater and a drying fan which are not shown in the figure are attached. Along with dielectric heating including infrared ray heating or microwave heating, warm or hot air are designed to be supplied to the images, if necessary.

The exemplary embodiment of the present invention includes a mode for drying in which infrared rays or microwaves are irradiated and warm or hot air is supplied in combination with these irradiation, but a heating mode of only using warm or hot air from a hot air dryer and another heating mode of passing an object to be heated through a heat roll may be included.

The drying device is installed in the ink-jet recording apparatus in an in-line or off-line configuration.

Drying is preferably performed at a heat quantity of 2 kJ (Joule) or less per 102 mm×152 mm (KG size). In the present invention, a specific ink that contains the specific water-soluble organic solvent is used, so that drying may be performed, by using the above described dielectric heating or infrared ray heating, at an energy consumption comparable or less as compared with the heat quantity required for drying in conventional drying processes. Drying is more preferably performed at a heat quantity of 1 kJ or less per 102 mm×152 mm (KG size) from the viewpoint of conserving heat energy, and even more preferably at a heat quantity of 0.5 kJ or less per KG size by microwave heating or infrared ray heating.

Upon drying, switch-on a heater, irradiation of infrared rays or microwaves, or supply of warm or hot air may start preferably within 20 seconds after the ink ejection is finished. More preferably, drying starts within 10 seconds after the ink ejection is finished, considering the effect of preventing color change.

Here, "ink ejection is finished" refers to the time when an ink drop ejected from the nozzle of the ink-jet head is finally landed on the ink receiving layer.

As the heater, a heating element such as a nichrome wire heater is usable, for instance.

In the drying device, drying is finished preferably within 600 seconds immediately after recording, considering enabling recording in which image density is high and hue difference (color change) immediately after recording is suppressed while not arising such a problem of curling, for instance, due to excess heating. Further, in a preferable mode, drying is performed for from 1 second to 300 seconds when the surface temperature of the recording medium is regulated in the range of from 25° C. to 60° C., and in a more preferable mode, drying is performed for from 1 second to 60 seconds when the surface temperature of the recording medium is regulated in the range of from 25° C. to 40° C.

As shown in FIG. 1, on the upstream side of the stage 14 in the running direction A along which the recording medium runs, a roll-up body 19 of the ink-jet recording medium is loaded. The ink-jet recording medium is supplied continuously to the stage from this roll-up body. The details of the ink-jet recording medium will be described later.

Between the roll-up body 19 and the stage 14, a driving roll 17*a* and press-contact rolls 17*b* and 17*c* that serve as a transporting unit are attached, which transports the ink-jet recording medium unrolled from the roll-up body 19 to the stage 14. When the ink-jet recording medium 13 enters into a nip portion formed between the large-diameter driving roll 17*a* and the press roll 17*b* that presses against the driving roll, the ink-jet recording medium 13 is transported by the driving roll 17*a* to the stage 14 through the press roll 17*c*.

On further downstream side of the pairs of rolls 15 in the running direction A along which the ink-jet recording medium 13 is transported, a sheet retrieve unit 20 is disposed through several transporting rolls. After dried with the drying device 12, the recorded ink-jet recording medium 13 is transported to the sheet retrieve unit 20 and successively stacked for retrieving.

In this way, after recording and drying, the recording medium is successively stacked for being retrieved in a manner that the resulting images are covered in a short time, however, hue difference (color change) may be prevented from being developed and the density is high because, as described before, an ink "that contains a water-soluble organic solvent having a rate of change in micropore median size of 13.0% or less in the ink receiving layer as measured by the mercury intrusion before and after the ink is applied onto the ink receiving layer in an amount of 6.6 $g/m^2$" is used, and a specific configuration is provided in which the ink is dried (preferably by infrared ray heating or microwave heating).

Ink-jet Recording Medium

In the present invention, an ink-jet recording medium having on a support an ink receiving layer that contains inorganic fine particles, a water-soluble resin, and a crosslinking agent is used to record images by an ink-jet method.

Hereinafter, the ink-jet recording medium is described.

The ink-jet recording medium has at least one ink receiving layer on a support. The ink receiving layer is composed of at least inorganic fine particles, a water-soluble resin, and a crosslinking agent. The ink-jet recording medium may have additional layers, if necessary.

Water-Soluble Resin

The ink receiving layer contains at least one water-soluble resin. Note that, the water-soluble resin is a resin that has a solubility in water of at least 10 g/100 g at an ordinary temperature (25° C.).

The water-soluble resins include, for instance, polyvinyl alcohol based resins that has a hydroxy group as a hydrophilic constituent unit (polyvinyl alcohol (PVA), acetoacetyl-modified polyvinyl alcohol, cation-modified polyvinyl alcohol, anion-modified polyvinyl alcohol, silanol-modified polyvinyl alcohol and polyvinyl acetal), cellulose based resins (methyl cellulose (MC), ethyl cellulose (EC), hydroxyethyl cellulose (HEC), carboxymethyl cellulose (CMC), hydroxypropyl cellulose (HPC), hydroxyethyl methyl cellulose and hydroxypropyl methyl cellulose), chitins, chitosans, starch, resins having an ether bond (polyethylene oxide (PEO), polypropylene oxide (PPO), polyethylene glycol (PEG) and polyvinyl ether (PVE)) and resins having a carbamoyl group (polyacrylamide (PAAM), polyvinyl pyrrolidone (PVP) and polyacrylic acid hydrazide). Furthermore, the water soluble resins include polyacrylic acid salts having a carboxy group as a dissociating group, maleic acid resins, alginic acid salts and gelatins.

Among these, polyvinyl alcohol based resins are preferable, and polyvinyl alcohol is particularly preferable.

In order to prevent reduction of layer strength or layer cracking at the time when the layer is dried, due to too small a content of the water-soluble resin, and prevent reduction of ink absorbing property caused by blocking of voids by resin due to too high a content of resin, the content of the water-soluble resin in the ink receiving layer is preferably 9% by mass to 40% by mass, and more preferably 12% by mass to 33% by mass with respect to the total solid mass of the ink receiving layer.

These water-soluble resins and the inorganic fine particles described below, which constitute mainly the ink receiving layer, each may be a single-component substance or combinations of multiple components.

From the viewpoint of preventing cracking of the layer, the number average polymerization degree of the polyvinyl alcohol is preferably 1800 or more, and more preferably 2000 or more. From the viewpoint of transparency of the layer, when water-soluble resin is used in combination with silica particles, the kind of water soluble resin is important. For combination with anhydrous silica, polyvinyl alcohol based resins are preferable as the water-soluble resin. Among them, polyvinyl alcohol based resins having a saponification degree of 70% to 99% are preferable.

As the polyvinyl alcohol based resins, derivatives of the specific example are also included, and the polyvinyl alcohol based resins may be used alone or in a combination of two or more of them.

The above polyvinyl alcohol based resins contain a hydroxy group as a constituent unit. Hydrogen bonding between the hydroxy groups and the surface silanol groups on silica fine particles allows the silica fine particles to form a three-dimensional network structure having secondary particles as the network chain units. This three-dimensional network structure thus constructed seems to be the cause of easier formation of an ink receiving layer having a porous structure having a higher porosity.

In ink-jet recording media, the ink receiving layer having a porous structure obtained in this manner absorbs inks rapidly due to the capillary phenomenon, and provides printed dots superior in circularity without ink bleeding.

(Inorganic Fine Particles)

The ink receiving layer according to the present invention contains at least one type of inorganic fine particles (herein after referred to as "fine particles" in some cases). Examples of the inorganic fine particles include particles of silica fine particles, colloidal silica, titanium dioxide, barium sulfate, calcium silicate, zeolite, kaolinite, halloysite, mica, talc, calcium carbonate, magnesium carbonate, calcium sulfate, alumina fine particles, boehmite, and pseudoboehmite. Among these particles, silica fine particles, colloidal silica, alumina fine particles, and pseudoboehmite are preferable. Particularly, vapor-phase process silica fine particles are preferable.

The silica fine particles in the above have an extremely large specific surface area, accordingly it provides the layer with a higher ink absorption and retention capacity. In addition, the silica fine particles have a low refractive index, and thus if dispersed to a suitable fine particle diameter, provides the ink receiving layer with better transparency, and higher color density and favorable coloring is obtainable. The transparency of ink receiving layer is important from the viewpoints of obtaining a high color density and favorable glossiness not only for applications wherein the transparency is required such as OHP sheets and the like, but also for applications as recording sheets such as photographic glossy papers and the like.

The particle size of the inorganic fine particles is defined as the particle diameter that is measured by observing the ink receiving layer of the resulting ink-jet recording medium with an electron microscope.

The particle size of the inorganic fine particles measured by observing the ink receiving layer with an electron microscope is preferably from 5 nm to 45 nm, more preferably from 5 nm to 35 nm, and particularly preferably from 10 nm to 30 nm. When the particle diameter is from 5 nm to 45 nm, high density recorded images are obtainable without worsening performances such as bronzing or glossiness, and color change immediately after recording may be highly suppressed.

The average primary particles diameter of the inorganic fine particles are preferably 20 nm or less, more preferably 15 nm or less, and particularly preferably 10 nm or less. When the average primary particle size of the particles are 20 nm or less, the ink-absorbing property can be effectively improved and at the same time, the glossiness of the surface of the ink receiving layer can be enhanced.

In particular with silica fine particles, since the surface has silanol groups, there is easy adhesion between the particles through the hydrogen bonding of the silanol groups, and there is an adhesion effect between the particles through the silanol groups and the water soluble resin. Hence, when the average primary size of the particles are 20 nm or less, then the porosity ratio of the ink receiving layer is high, and a structure with high transparency can be formed, and the ink-absorbing property can be effectively raised.

Silica fine particles are commonly classified roughly into wet method particles and dry method (vapor phase process) particles according to the method of manufacture. By the wet method, silica particles are mainly produced by generating an activated silica by acid decomposition of a silicate, polymerizing to a proper degree the activated silica, and coagulating the resulting polymeric silica to give a hydrated silica. Alternatively by the gas phase process, an anhydrous silica is mainly produced by high-temperature vapor-phase hydrolysis of a silicon halide (flame hydrolysis process), or by reductively heating and vaporizing quartz and coke in an electric furnace by applying an arc discharge and then oxidizing the vaporized silica with air (arc method).

The vapor-phase process silica (anhydrous silica fine particles produced by vapor phase process) is different in the density of silanol groups on the surface and the presence of voids therein and exhibits different properties from hydrated silica. The vapor-phase process silica is suitable for forming a three-dimensional structure having a higher porosity. The reason is not clearly understood. Hydrated silica fine particles have a higher density of 5 silanol groups/$nm^2$ to 8 silanol groups/$nm^2$ on their surface. Thus the silica fine particles tend to coagulate densely. While the vapor phase process silica fine particles have a lower density of 2 silanol groups/$nm^2$ to 3 silanol groups/$nm^2$ on their surface. Therefore, vapor-phase process silica seems to cause more scarce, softer coagulations (flocculates), consequently leading to a structure having a higher porosity. In the present invention, the vapor-phase process silica fine particles (anhydrous silica) obtained by the above wet method are preferable, and silica fine particles having a density of 2 to 3 silanol groups/nm2 on their surface are more preferable.

<Ratio of Inorganic Fine Particles to Water-Soluble Resin Contained>

The content ratio (PB ratio: x/y, inorganic fine particles with respect to 1 part by mass of water soluble resin) of the mass of inorganic fine particles (preferably silica fine particles; x) to the mass of water-soluble resin (y) has a great influence on the structure of the ink receiving layer. A larger weight ratio (PB ratio) tends to result in increase in porosity, pore volume, and surface area (per unit mass).

When an ink-jet recording medium goes past a transportation system of an ink-jet printer, in some cases, it receives stress; accordingly, the ink receiving layer necessarily has sufficient film strength. Furthermore, when the ink-jet recording medium is cut in sheet, in order to inhibit the ink receiving layer from cracking and peeling as well, the ink receiving layer is necessary to have sufficient film strength. Thus the PB ratio is preferably 4.5 or less from the viewpoint of improving hardness of the ink receiving layer. Further the PB ratio is more preferably 4.3 or less, and even more preferably 4.15 or less. Though not particularly restricted, in order to prevent reduction of ink-absorbing property caused by blocking of voids by resin, the PB ratio is preferably 1.5 or more. Furthermore, from the viewpoint of assuring high speed ink absorbing, the PB ratio is preferably 2 or more.

For example, when a coating liquid, containing anhydrous silica fine particles, having an average primary particle diameter of 20 nm or less, and a water-soluble resin homogeneously dispersed in an aqueous solution at a PB ratio (x/y) of between 2/1 and 4.5/1, is applied and dried on a support, a three-dimensional network structure having the secondary particles of silica fine particles as the network chains is formed. Such a coating liquid easily provides a light-transmitting porous layer having an average void diameter of 30 nm or less, a porosity of 50% to 80%, a micropore specific volume of 0.5 mL//g or more, and a specific surface area of 100 $m^2$/g or more.

Crosslinking Agent

The ink receiving layer contains at least one of crosslinking agent capable of crosslinking the water-soluble resin. By incorporating the crosslinking agent, the water-soluble resin is crosslinked and a cured porous layer is obtained.

As described above, the ink contains a specific water-soluble organic solvent that has a rate of change in the micropore median size of 13.0% or less in the ink receiving layer as measured by the mercury intrusion method before and after the ink is applied to the ink receiving layer in an amount of 6.6 g/$m^2$, so that the micropores are prevented from being decreased in size when the ink is applied to the ink receiving layer that is crosslinked with the crosslinking agent. From this viewpoint, the content of the crosslinking agent in the ink receiving layer is preferably in the range of from 5% by mass to 50% by mass and more preferably from 8% by mass to 30% by mass, with respect to the water-soluble resin.

When the content of the crosslinking agent is in the above range, the micropore size in the porous structure is prevented from being decreased when the ink is applied and color change that develops immediately after recording is prevented, so that images in which density is high and color difference (color change) is prevented from occurring are obtained even in a processing system such as high-speed recording, high-volume recording, or double-sided recording in which sracking proceeds in a short time after recording. In addition, cracking or the like may be prevented and an excellent resistance against scratching is also obtained.

The crosslinking agent may be used alone or in a combination of two or more of them.

The above crosslinking agent may be selected appropriately in relation to the water-soluble resin contained in the ink receiving layer, but boron compounds are preferable, as they allow faster crosslinking reaction. Examples of the boron compounds include borax, boric acid, borate salts [e.g., orthoborate salts, $InBO_3$, $ScBO_3$, $YBO_3$, $LaBO_3$, $Mg_3(BO_3)_2$, and $Co_3(BO_3)_2$], diborate salts [e.g., $Mg_2B_2O_5$, and $CO_2B_2O_5$], metaborate salts [e.g., $LiBO_2$, $Ca(BO_2)_2$, $NaBO_2$, and $KBO_2$], tetraborate salts [e.g., $Na_2B_4O_7.10OH_2O$], pentaborate salts [e.g., $KB5O_8.4H_2O$, $Ca_2B_6O_{11}.7H_2O$, and $CsB_5O_5$], and the like. Among them, borax, boric acid and borates are preferable since they are able to promptly cause a crosslinking reaction. Particularly, boric acid is preferable, and the combination of polyvinyl alcohol and boric acid is most preferred.

The crosslinking agent of the polyvinyl alcohol preferably includes the following compounds in addition to the boron compounds.

Examples of such crosslinking agents include: aldehyde compounds such as formaldehyde, glyoxal and glutaraldehyde; ketone compounds such as diacetyl and cyclopentanedione; active halogen compounds such as bis(2-chloroethylurea), 2-hydroxy-4,6-dichloro-1,3,5-triazine and 2,4-dichloro-6-S-triazine sodium salt; active vinyl compounds such as divinyl sulfonic acid, 1,3-bis(vinylsulfonyl)-2-propanol, N,N'-ethylenebis(vinylsulfonylacetamide) and 1,3,5-triacryloyl-hexahydro-S-triazine; N-methylol compounds such as dimethylolurea and methylol dimethylhydantoin; melamine resin such as methylolmelamine and alkylated methylolmelamine; epoxy resins; isocyanate compounds such as 1,6-hexamethylenediisocyanate; aziridine compounds such as those described in U.S. Pat. Nos. 3,017,280 and 2,983,611; carboxyimide compounds such as those described in U.S. Pat. No. 3,100,704; epoxy compounds such as glycerol triglycidyl ether; ethyleneimino compounds such as 1,6-hexamethylene-N,N'-bisethylene urea; halogenated carboxyaldehyde compounds such as mucochloric acid and mucophenoxychloric acid; dioxane compounds such as 2,3-dihydroxydioxane; metal-containing compounds such as titanium lactate, aluminum sulfate, chromium alum, potassium alum, zirconyl acetate and chromium acetate; polyamine compounds such as tetraethylene pentamine; hydrazide compounds such as adipic acid dihydrazide; and low molecular compounds or polymers containing at least two oxazoline groups.

Furthermore, as the crosslinking agent of the water soluble resin in the invention, polyvalent metal compounds cited below are also preferable. The polyvalent metal compound not only works as the crosslinking agent but also further improves the ozone resistance, image bleeding and glossiness.

As the polyvalent metal compound, water-soluble compounds are preferable. Examples thereof include calcium acetate, calcium chloride, calcium formate, calcium sulfate, barium acetate, barium sulfate, barium phosphate, manganese chloride, manganese acetate, manganese formate dihydrate, manganese ammonium sulfate hexahydrate, cupper (II) chloride, ammonium copper (II) chloride dihydrate, copper sulfate, cobalt chloride, cobalt thiocyanate, cobalt sulfate, nickel sulfate hexahydrate, nickel chloride hexahydrate, nickel acetate tetrahydrate, nickel ammonium sulfate hexahydrate, nickel amidosulfate tetrahydrate, aluminum sulfate, aluminum alum, aluminum sulfite, aluminum thiosulfate, polyaluminum chloride, aluminum nitrate nonahydrate, aluminum chloride hexahydrate, ferrous bromide, ferrous chloride, ferric chloride, ferrous sulfate, ferric sulfate, zinc phenolsulfonate, zinc bromide, zinc chloride, zinc nitrate hexahydrate, zinc sulfate, titanium tetrachloride, tetraisopropyl titanate, titanium acetyl acetonate, titanium lactate, zirconium acetyl acetonate, zirconyl acetate, zirconyl sulfate, zirconyl ammonium carbonate, zirconyl stearate, zirconyl octylate, zirconyl nitrate, zirconium oxychloride, zirconium hydroxychloride, chromium acetate, chromium sulfate, magnesium sulfate, magnesium chloride hexahydrate, magnesium citrate nonahydrate, sodium phosphorustungstate, sodium tungsten citrate, 12 tungstophosphoric acid n-hydrate, 12 tungstosilicic acid 26-hydrate, molybdenum chloride, 12 molybdophosphoric acid n-hydrate, gallium nitrate, germanium nitrate, strontium nitrate, yttrium acetate, yttrium chloride, yttrium nitrate, indium nitrate, lanthanum nitrate, lanthanum chloride, lanthanum acetate, lanthanum benzoate, cerium chloride, cerium sulfate, cerium octylate, praseodymium nitrate, neodymium nitrate, samarium nitrate, europium nitrate, gadolinium nitrate, dysprosium nitrate, erbium nitrate, ytterbium nitrate, hafnium chloride and bismuth nitrate.

Among the foregoing polyvalent metal compounds, preferable example include aluminum-containing compounds (water-soluble aluminum compounds) such as aluminum sulfate, aluminum alum, aluminum sulfite, aluminum thiosulfate, polyaluminum chloride, aluminum nitrate nonahydrate and aluminum chloride hexahydrate; zirconyl-containing compounds (water-soluble zirconyl compounds) such as zirconyl acetyl acetonate, zirconyl acetate, zirconyl sulfate, zirconyl ammonium carbonate, zirconyl stearate, zirconyl octylate, zirconyl nitrate, zirconium oxychloride and zirconium hydroxychloride; and titanium-containing compounds such as titanium tetrachloride, tetraisopropyl titanate, titanium acetyl acetonate and titanium lactate. Among these, polyaluminum chloride, zirconyl acetate, zirconyl ammonium carbonate and zirconyl oxychloride are particularly preferable.

As the crosslinking agent in the invention, among above-cited compounds, boron compounds and zirconyl compounds are particularly preferable.

From viewpoints of working as a preferable crosslinking agent and of further improving the ozone resistance, image bleeding resistance and glossiness, the polyvalent metal compound (particularly preferably, the zirconyl compound) is preferably contained in amount of 0.1% by mass or more, more preferably 0.5% by mass or more and particularly preferably 1.0% by mass or more with respect to the water-soluble resin. Furthermore, the upper limit of the content of the polyvalent metal compound, though not particularly restricted, from viewpoints of the image density, ink-absorbing property and suppression of curl of the recording medium, is preferably 50% by mass.

In the invention, the crosslinking agent can be supplied in a number of ways, such as when forming the ink receiving layer, the above crosslinking agents can be added to the ink receiving layer coating liquid and/or a coating liquid which is used for forming a layer adjacent to the ink receiving layer. Or a coating liquid which includes the crosslinking agent can be applied in advance onto the support and the ink receiving layer coating liquid can be coated. Or, a solution of the crosslinking agent can be over-coated onto a coating of an ink receiving layer coating liquid not including a crosslinking agent after it has dried. From the perspective of manufacturing efficiency, it is preferable that the crosslinking agent is added to the ink receiving layer coating liquid or a coating liquid for forming an adjacent layer, and the crosslinking agent is supplied at the same time as forming the ink receiving layer. In particular, from the perspective of raising the print image density and glossiness of images, it is preferable to include the crosslinking agent in the coating liquid for the ink receiving layer. It is preferable that the concentration of the crosslinking agent in the ink receiving liquid coating layer is from 0.05% by mass to 10% by mass, and more preferably from 0.1% by mass to 7% by mass.

For instance, the crosslinking agent may be preferably incorporated as described below. An example using a boron compound will be explained herein.

When the ink receiving layer is a layer that is obtained by crosslinking and curing a coating layer of a coating liquid for an ink receiving layer, crosslinking and curing are performed by applying a basic solution with a pH of at least 7.1 on the coating layer at the time either (1) simultaneously when the coating liquid is applied to form the coating layer or (2) during drying the coating layer formed by applying the coating liquid and before falling-drying-rate appears in the coating layer. A boron compound serving as the crosslinking agent may be incorporated at least either in the coating liquid or in the basic solution.

(Ammonium Carbonate)

In the ink receiving layer according to the invention, ammonium carbonate is preferably further contained. When ammonium carbonate is contained in the ink receiving layer, an ink receiving layer high in the hardness can be obtained.

The content of the ammonium carbonate in the ink receiving layer is preferably 8% by mass or more, more preferably 9% by mass or more and particularly preferably 11% by mass or more with respect to the water soluble resin. Furthermore, the upper limit of the content thereof, though not particularly restricted, from viewpoints of the image density, ink absorbing property and suppression of curl of the recording medium, is preferably 20% by mass.

(Water Dispersible Cationic Resin)

Furthermore, the ink receiving layer according to the invention may contain, a water dispersible cationic resin. As the water dispersible cationic resin, a polymer that is a cation-modified self-emulsifiable polymer is described. A urethane resin is preferable. The glass transition temperature of the water dispersible cationic resin is preferably lower than 50° C.

The “cation-modified self-emulsifiable polymer” means a polymer that can naturally form stable emulsified dispersion in an aqueous dispersion medium without using an emulsifier or surfactant or with only a slight amount thereof added. Quantitatively, the “cation-modified self-emulsifiable polymer” represents a polymer that has stable emulsified dispersibility at a concentration of 0.5% by mass or more relative to the aqueous dispersion medium at room temperature of 25° C. The concentration is preferably 1% by mass or more and more preferably 3% by mass or more.

As the “cation-modified self-emulsifiable polymer” according to the invention, more specifically, for instance, polyaddition or polycondensation polymer compounds having a cationic group such as primary, secondary or tertiary amino group or a quaternary ammonium group can be cited.

For the above polymers, for example, vinyl polymerization based polymers can be used, such as polymers obtained by the polymerization of the following vinyl monomers. Examples of the vinyl monomers include: acrylic acid esters and methacrylic acid esters (as substituents for the ester group are alkyl and allyl groups, for example, the following groups can be used, methyl, ethyl, n-propyl, isopropyl, n-butyl, sec-butyl, tert-butyl, hexyl, 2-ethylhexyl, tert-octyl, 2-chloroethyl, cyanoethyl, 2-acetoxyethyl, tetrahydrofurfuryl, 5-hydroxypentyl, cyclohexyl, benzyl, hydroxyethyl, 3-methoxybutyl, 2-(2-methoxyethoxy)ethyl, 2,2,2-tetrafuroroethyl, 1H, 1H, 2H, 2H-perfluorodecyl, phenyl, 2,4,4-tetramethyl phenyl, and 4-chlorophenyl);

vinyl esters, specifically aliphatic carboxylic acid vinyl esters which may have a substituent (for example, vinyl acetate, vinyl propionate, vinylbutyrate, vinyl isobutyrate, vinylcaproate, and vinylchloroacetate), aromatic carboxylic acid vinyl esters which may have a substituent (for example benzoic acid vinyl, 4-methyl benzoic acid vinyl, and salicylic acid vinyl);

acrylic amides specifically acrylic amides, N-monosubstituted acrylic amides, N-disubstituted acrylic amides (for substituents there are substitutable groups such as alkyl, aryl, and silyl, for example, methyl, n-propyl, isopropyl, n-butyl, tert-butyl, tert-octyl, cyclohexyl, benzyl, hydroxymethyl, alkoxymethyl, phenyl, 2,4,5-tetramethylphenyl, 4-chlorophenyl, and trimethylsilyl);

methacrylic amides, specifically methacrylic amides, N-monosubstituted methacrylic amides, N-disubstituted methacrylic amides (for substituents there are substitutable groups such as alkyl, aryl, and silyl, for example, methyl, n-propyl, isopropyl, n-butyl, tert-butyl, tert-octyl, cyclohexyl, benzyl, hydroxymethyl, alkoxymethyl, phenyl, 2,4,5-tetramethylphenyl, 4-chlorophenyl, and trimethylsilyl);

olefins (for example, ethylene, propylene, 1-pentene, vinyl chloride, vinylidene chloride, isoprene, chloroprene, and butadiene), styrenes (for example, styrene, methylstyrene, isopropylstyrene, methoxystyrene, acetoxystyrene, and chlorostyrene), vinyl ethers (for example, methyl vinyl ether, butyl vinyl ether, hexyl vinyl ether, and methoxyethyl vinyl ether).

As the other vinyl monomer, examples include listed crotonate esters, itaconate esters, maleate diesters, fumarate diesters, methyl vinyl ketone, phenyl vinyl ketone, methoxyethyl vinyl ketone, N-vinyloxazolidone, N-vinylpyrrolidone, methylenemalonnitrile, diphenyl-2-acryloyloxyethyl phosphate, diphenyl-2-methacryloyloxyethyl phosphate, dibutyl-2-acryloyloxyethyl phosphate, dioctyl-2-methacryloyloxyethyl phosphate and the like.

As the cationic group-containing monomer for applying a cationic group, there are, for example, monomers having a tertiary amino group, such as dialkylaminoethyl methacrylates, dialkylaminoethyl acrylates and the like.

As polyurethanes applicable to the cationic-group-containing polymer, there are, for example, polyurethanes synthesized by the addition polymerization reaction of various combinations of the diol compounds with the diisocyanate compounds listed below.

Examples of the above-mentioned diol compound include ethylene glycol, 1,2-propanediol, 1,3-propanediol, 1,2-butanediol, 1,3-butanediol, 2,3-butanediol, 2,2-dimethyl-1,3-propanediol, 1,2-pentanediol, 1,4-pentanediol, 1,5-pentanediol, 2,4-pentanediol, 3,3-dimethyl-1,2-butanediol, 2-ethyl-2-methyl-1,3-propanediol, 1,2-hexanediol, 1,5-hexanediol, 1,6-hexanediol, 2,5-hexanediol, 2-methyl-2,4-pentanediol, 2,2-diethyl-1,3-propanediol, 2,4-dimethyl-2,4-pentanediol, 1,7-heptanediol, 2-methyl-2-propyl-1,3-propanediol, 2,5-dimethyl-2,5-hexanediol, 2-ethyl-1,3-hexanediol, 1,2-octanediol, 1,8-octanediol, 2,2,4-trimethyl-1,3-pentanediol, 1,4-cyclohexanedimethanol, hydroquinone, diethylene glycol, triethylene glycol, dipropylene glycol, tripropylene glycol, polyethylene glycols (average molecular weight=200, 300, 400, 600, 1000, 1500, 4000), polypropylene glycols (average molecular weight=200, 400, or 1000), polyester polyols, 4,4'-dihydroxy-diphenyl-2,2-propane, 4,4'-dihydroxyphenylsulfone, and the like.

As the above-mentioned diisocyanate compound, examples include methylene diisocyanate, ethylene diisocyanate, isophorone diisocyanate, hexamethylene diisocyanate, 1,4-cyclohexane diisocyanate, 2,4-toluene diisocyanate, 2,6-toluene diisocyanate, 1,3-xylylene diisocyanate, 1,5-naphthalene diisocyanate, m-phenylene diisocyanate, p-phenylene diisocyanate, 3,3'-dimethyl-4,4'-diphenylmethane diisocyanate, 3,3'-dimethylbiphenylene diisocyanate, 4,4'-biphenylene diisocyanate, dicyclohexylmethane diisocyanate, methylene bis(4-cyclohexyl isocyanate), and the like.

As the cationic group contained in the polyurethane, a cationic group such as primary to tertiary amines or quaternary ammonium salts may be included. As the self-emulsifiable polymer used for the aqueous dispersion, an urethane resin having a cationic group such as a tertiary amine or a quaternary ammonium salt is preferable. This urethane resin having a cationic group may be obtained, for instance, by using a source chemical given by incorporating a cationic group in the diols, when polyurethane is synthesized. In the case of quaternary ammonium salts, a polyurethane having a tertiary amino group may be quaternized with a quaternizing agent.

The diol compounds and diisocyanate compounds usable for synthesizing the polyurethane may be used each alone, or may be used in combinations of two or more in various proportions decided depending on the purpose (for example, control of the polymer glass transition temperature (Tg), improving solubility, providing compatibility with a binder, and improving stability of a dispersion).

(Mordant)

The ink receiving layer preferably contains a mordant such as shown below to further improve the bleeding resistance over time and water resistance. As the mordant, organic mordants such as cationic polymers (cationic mordants) and inorganic mordants such as water soluble metal compounds are preferable. As the cationic mordant, polymer mordants having, as a cationic functional group, a primary, secondary or tertiary amino group or a quaternary ammonium salt group can be preferably used. A cationic non-polymer mordant can be used as well.

As the polymer mordant, homopolymers of monomers (mordant monomers) having a primary, secondary or tertiary amino group and salts thereof or a quaternary ammonium salt group, and copolymers or polycondensates between the mordant monomer and other monomer (non-mordant monomer) can be preferably used. Furthermore, the polymer mordants can be used in either form of a water soluble polymer or aqueous dispersion latex particles.

Examples of the above mordant monomer include trimethyl-p-vinylbenzylammonium chloride, trimethyl-m-vinylbenzylammonium chloride, triethyl-p-vinylbenzylammonium chloride, triethyl-m-vinylbenzylammonium chloride, N,N-dimethyl-N-ethyl-N-p-vinylbenzylammonium chloride, N,N-diethyl-N-methyl-N-p-vinylbenzylammonium chloride, N,N-dimethyl-N-n-propyl-N-p-vinylbenzylammonium chloride, N,N-dimethyl-N-n-octyl-N-p-vinylbenzylammonium chloride, N,N-dimethyl-N-benzyl-N-p-vinylbenzylammonium chloride, N,N-diethyl-N-benzyl-N-p-vinylbenzylammonium chloride, N,N-dimethyl-N-(4-methyl)benzyl-N-p-vinylbenzylammonium chloride, N,N-dimethyl-N-phenyl-N-p-vinylbenzylammonium chloride, trimethyl-p-vinylbenzylammonium bromide, trimethyl-m-vinylbenzylammonium bromide, trimethyl-p-vinylbenzylammonium sulfonate, trimethyl-m-vinylbenzylammonium sulfonate, trimethyl-p-vinylbenzylammonium acetate, trimethyl-m-vinylbenzylammonium acetate, N,N,N-triethyl-N-2-(4-vinylphenyl)ethylammonium chloride, N,N,N-triethyl-N-2-(3-vinylphenyl)ethylammonium chloride, N,N-diethyl-N-methyl-N-2-(4-vinylphenyl)ethylammonium chloride, N,N-diethyl-N-methyl- N-2-(4-vinylphenyl)ethylammonium acetate; quaternary compounds obtained by reacting methyl chlorides, ethyl chlorides, methyl bromides, ethyl bromides, methyl iodides, or ethyl iodides with N,N-dimethylaminoethyl(meth)acrylate, N,N-diethylaminoethyl(meth)acrylate, N,N-dimethylaminopropyl(meth)acrylate, N,N-diethylaminopropyl(meth)acrylate, N,N-dimethylaminoethyl(meth)acrylamide, N,N-diethylaminoethyl(meth)acrylamide, N,N-dimethylaminopropyl(meth)acrylamide, or N,N-diethylaminopropyl(meth)acrylamide; and sulfonates, alkyl sulfonates, acetates, or alkyl carboxylates derived from the quaternary compounds by replacement of the anion.

Specific examples of such compounds include monomethyldiallylammonium chloride, trimethyl-2-(methacryloyloxy)ethylammonium chloride, triethyl-2-(methacryloyloxy)ethylammonium chloride, trimethyl-2-(acryloyloxy)ethylammonium chloride, triethyl-2-(acryloyloxy)ethylammonium chloride, trimethyl-3-(methacryloyloxy)propylammonium chloride, triethyl-3-(methacryloyloxy)propylammonium chloride, trimethyl-2-(methacryloylamino)ethylammonium chloride, triethyl-2-(methacryloylamino)ethylammonium chloride, trimethyl-2-(acryloylamino)ethylammonium chloride, triethyl-2-(acryloylamino)ethylammonium chloride, trimethyl-3-(methacryloylamino)propylammonium chloride, triethyl-3-(methacryloylamino)propylammonium chloride, trimethyl-3-(acryloylamino) propylammonium chloride, triethyl-3-(acryloylamino)propylammonium chloride, N,N-dimethyl-N-ethyl-2-(methacryloyloxy)ethylammonium chloride, N,N-diethyl-N-methyl-2-(methacryloyloxy)ethylammonium chloride, N,N-dimethyl-N-ethyl-3-(acryloylamino)propylammonium chloride, trimethyl-2-(methacryloyloxy)ethylammonium bromide, trimethyl-3-(acryloylamino)propylammonium bromide, trimethyl-2-(methacryloyloxy)ethylammonium sulfonate, and trimethyl-3-(acryloylamino)propylammonium acetate.

Examples of other copolymerizable monomers include N-vinylimidazole and N-vinyl-2-methylimidazole. Further, by using a polymerization unit such as N-vinylacetamide, or N-vinylformamide, then forming a vinylamine unit by hydrolysis after the polymerization, and a salt thereof also can be used.

The term "a non-mordant monomer" refers to a monomer that does not have a basic or cationic moiety, such as a primary, secondary or tertiary amino group, a salt thereof, or a quaternary ammonium salt group, and exhibits no or substantially little interaction with dye in ink-jet ink.

Examples of non-mordant monomers include alkyl(meth)acrylates; cycloalkyl(meth)acrylates such as cyclohexyl(meth)acrylate; aryl(meth)acrylates such as phenyl(meth)acrylate; aralkyl ester such as benzyl(meth)acrylate; aromatic vinyl compounds such as styrene, vinyltoluene and α-methylstyrene; vinyl esters such as vinyl acetate, vinyl propionate and vinyl versatate; allyl esters such as allyl acetate; halogen-containing monomers such as vinylidene chloride and vinyl chloride; vinyl cyanides such as (meth)acrylonitrile; and olefins such as ethylene and propylene.

The above alkyl(meth)acrylates preferably have 1 to 18 carbon atoms in the alkyl moiety. Examples of such alkyl(meth)acrylates include methyl(meth)acrylate, ethyl(meth)acrylate, propyl(meth)acrylate, isopropyl(meth)acrylate, n-butyl(meth)acrylate, isobutyl(meth)acrylate, tert-butyl(meth)acrylate, hexyl(meth)acrylate, octyl(meth)acrylate, 2-ethylhexyl(meth)acrylate, lauryl(meth)acrylate, and stearyl(meth)acrylate.

Particularly preferred are methyl acrylate, ethyl acrylate, methyl methacrylate, ethyl methacrylate, and hydroxyethyl methacrylate.

One non-mordant monomer may be used alone or two or more non-mordant monomers may be used in combination.

Furthermore, as the polymer mordant, polydiallyldimethylammonium chloride, polymethacryloyloxyethyl-β-hydroxyethyldimethylammonium chloride, polyethyleneimine, polyamide-polyamine resins, cationic starch, dicyandiamide formaline condensates, dimethyl-2-hydroxypropylammonium salt polymers, polyamidine, polyvinylamine, dicyan-based cationic resins represented by dicyandiamide-formaline polycondensates, polyamine-based cationic resins represented by dicyanamide-diethylenetriamine polycondensates, epichlorohydrin-dimethylamine addition polymers, dimethyldiallylammonium chloride-$SO_2$ copolymers and diallylamine salt-$SO_2$ copolymers can be preferably cited.

Specific examples of the polymer mordant include those described in JP-A Nos. 48-28325, 54-74430, 54-124726, 55-22766, 55-142339, 60-23850, 60-23851, 60-23852, 60-23853, 60-57836, 60-60643, 60-118834, 60-122940, 60-122941, 60-122942, 60-235134 and 1-161236; U.S. Pat. Nos. 2,484,430, 2,548,564, 3,148,061, 3,309,690, 4,115,124, 4,124,386, 4,193,800, 4,273,853, 4,282,305, and 4,450,224; JP-A Nos. 1-161236, 10-81064, 10-119423, 10-157277, 10-217601, 11-348409, 2001-138621, 2000-43401, 2000-211235, 2000-309157, 2001-96897, 2001-138627, 11-91242, 8-2087, 8-2090, 8-2091, 8-2093, 8-174992, 11-192777, and 2001-301314.

As the inorganic mordant, other than the above, polyvalent water soluble metal salts and hydrophobic metal salt compounds can be cited. Specific examples of the inorganic mordants include salts and complexes of a metal selected from magnesium, aluminum, calcium, scandium, titanium, vanadium, manganese, iron, nickel, copper, zinc, gallium, germanium, strontium, yttrium, zirconium, molybdenum, indium, barium, lanthanum, cerium, praseodymium, neodymium, samarium, europium, gadolinium, dysprosium, erbium, ytterbium, hafnium, tungsten, and bismuth.

Specific examples thereof include calcium acetate, calcium chloride, calcium formate, calcium sulfate, barium acetate, barium sulfate, barium phosphate, manganese chloride, manganese acetate, manganese formate dihydrate, manganese ammonium sulfate hexahydrate, copper (II) chloride, ammonium copper (II) chloride dihydrate, copper sulfate, cobalt chloride, cobalt thiocyanate, cobalt sulfate, nickel sulfate hexahydrate, nickel chloride hexahydrate, nickel acetate tetrahydrate, nickel ammonium sulfate hexahydrate, nickel amidosulfate tetrahydrate, aluminum sulfate, aluminum alum, basic polyaluminum hydroxide, aluminum sulfite, aluminum thiosulfate, polyaluminum chloride, aluminum nitrate nonahydrate, aluminum chloride hexahydrate, ferrous bromide, ferrous chloride, ferric chloride, ferrous sulfate, ferric sulfate, zinc phenolsulfonate, zinc bromide, zinc chloride, zinc nitrate hexahydrate, zinc sulfate, titanium tetrachloride, tetraisopropyl titanate, titanium acetylacetonate, titanium lactate, zirconium acetylacetonate, zirconyl acetate, zirconyl sulfate, zirconium ammonium carbonate, zirconyl stearate, zirconyl octylate, zirconyl nitrate, zirconium oxychloride, zirconium hydroxychloride, chromium acetate, chromium sulfate, magnesium sulfate, magnesium chloride hexahydrate, magnesium citrate nonahydrate, sodium phosphotungstate, sodium tungsten citrate, undecatungstophosphoric acid n-hydrate, undecatungstosilicic acid 26-hydrate, molybdenum chloride, undecamolybdophosphoric acid n-hydrate, potassium nitrate, manganese acetate, germanium nitrate, strontium nitrate, yttrium acetate, yttrium chloride, yttrium nitrate, indium nitrate, lanthanum nitrate, lanthanum chloride, lanthanum acetate, lanthanum benzoate, cerium chloride, cerium sulfate, cerium octylate, praseodymium nitrate, neodymium nitrate, samarium nitrate, europium nitrate, gadolinium nitrate, dysprosium nitrate, erbium nitrate, ytterbium nitrate, hafnium chloride and bismuth nitrate. Among these, aluminum-containing compounds, titanium-containing compounds, zirconium-containing compounds and compounds of metals belonging to IIIB group of periodic table (salts or complexes) are preferable.

Furthermore, the "polyvalent metal compounds" cited in the section of the (crosslinking agent) as well can be preferably used as the mordant.

An amount of the mordant added to the ink receiving layer is preferably in the range of 0.01 $g/m^2$ to 5 $g/m^2$.

Other Components

The ink receiving layer may contain, if necessary, various anti-fading agents such as UV light absorbers, antioxidants, or singlet oxygen quenchers. By incorporating these, ink degradation may be suppressed.

Examples of the ultraviolet absorbers include cinnamic acid derivatives, benzophenone derivative and benzotriazolyl phenol derivatives. Specific examples include (a-cyano-phenylcinnamic acid butyl, o-benzotriazole phenol, o-benzotriazole-p-chlorophenol, o-benzotriazole-2,4-di-t-butylphenol, o-benzotriazole-2,4-di-t-octylphenol. A hindered phenol compound can be also used as an ultraviolet absorber, and phenols in which at least one of the second position and/or the sixth position is substituted by a branched alkyl group is preferable.

A benzotriazole based ultraviolet absorber, a salicylic acid based ultraviolet absorber, a cyano acrylate based ultraviolet absorber, and an oxalic acid anilide based ultraviolet absorber or the like can be also used. For instance, the ultraviolet absorbers are described in JP-A Nos. 47-10537, 58-111942, 58-212844, 59-19945, 59-46646, 59-109055 and 63-53544, Japanese Patent Application Publication (JP-B) Nos. 36-10466, 42-26187, 48-30492, 48-31255, 48-41572 and 48-54965, 50-10726, U.S. Pat. Nos. 2,719,086, 3,707,375, 3,754,919 and 4,220,711 or the like.

A fluorescent whitening agent can be also used as an ultraviolet absorber, and specific examples include a coumalin based fluorescent whitening agent. Specific examples are described in JP-B Nos. 45-4699 and 54-5324 or the like.

Examples of the antioxidants are described in EP Nos. 223739, 309401, 309402, 310551, 310552 and 459416, D.E. Patent No. 3435443, JP-A Nos. 54-48535, 60-107384, 60-107383, 60-125470, 60-125471, 60-125472, 60-287485, 60-287486, 60-287487, 60-287488, 61-160287, 61-185483, 61-211079, 62-146678, 62-146680, 62-146679, 62-282885, 62-262047, 63-051174, 63-89877, 63-88380, 66-88381, 63-113536, 63-163351, 63-203372, 63-224989, 63-251282, 63-267594, 63-182484, 1-239282, 2-262654, 2-71262, 3-121449, 4-291685, 4-291684, 5-61166, 5-119449, 5-188687, 5-188686, 5-110490, 5-1108437 and 5-170361, JP-B Nos. 48-43295 and 48-33212, U.S. Pat. Nos. 4,814,262 and 4,980,275.

Specific examples of the antioxidants include 6-ethoxy-1-phenyl-2,2,4-trimethyl-1,2-dihydroquinoline, 6-ethoxy-1-octyl-2,2,4-trimethyl-1,2-dihydroquinoline, 6-ethoxy-1-phenyl-2,2,4-trimethy-1,2,3,4-tetrahydroquinoline, 6-ethoxy-1-octyl-2,2,4-trimethyl-1,2,3,4,-tetrahydroquinoline, nickel cyclohexanoate, 2,2-bis(4-hydroxyphenyl)propane, 1,1-bis(4-hydroxyphenyl)-2-ethylhexane, 2-methyl-4-methoxy-diphenylamine, 1-methyl-2-phenyl indole.

These anti-fading agents can be used singly or in a combinations of two or more of them. The anti-fading agents can be dissolved in water, dispersed, emulsified, or they can be included in microcapsules. The amount of the anti-fading agents added is preferably 0.01% by mass to 10% by mass, relative to the total mass of the ink receiving layer coating liquid.

In the invention, in order to prevent curl, it is preferable to include organic solvents with a high boiling point in the ink receiving layer.

For the above high boiling point organic solvents water soluble ones are preferable. As water soluble organic solvents with high boiling points the following alcohols are examples: ethylene glycol, propylene glycol, diethylene glycol, triethylene glycol, glycerin, diethylene glycol monobutyl ether (DEGMBE), triethylene glycol monobutyl ether, glycerin monomethyl ether, 1,2,3-butanetriol, 1,2,4-butanetriol, 1,2,4-pentanetriol, 1,2,6-hexanetriol, thiodiglycol, triethanolamine, polyethylene glycol (average molecular weight of 400 or less). Diethylene glycol monobutyl ether (DEGMBE) is preferable.

The amount of the above high boiling point organic solvents used in the ink receiving layer (or the coating liquid for the ink receiving layer) is preferably 0.05% by mass to 1% by mass, and particularly preferably is 0.1% by mass to 0.6% by mass.

The ink receiving layer may contain various inorganic salts and acids and alkalis as a pH controlling agent for the purpose of enhancing dispersibility of inorganic particles.

Furthermore, from the viewpoints of suppressing frictional electrification and peeling electrification of the ink receiving layer, metal oxide fine particles may be contained in the ink receiving layer. And from the viewpoint of reducing a frictional property of the surface, various matting agents may be contained in the ink receiving layer.

To the ink receiving layer, a polymer fine particle dispersion may be added. The polymer fine particle dispersion is used for the purpose of improving film properties such as dimension stabilization, curl prevention, adhesion prevention, or cracking prevention of films. The polymer fine particle dispersion is described in JP-A Nos. 62-245258, 62-1316648, and 62-110066. Note that, when a polymer fine particle dispersion with a low glass transition temperature (40° C. or lower) is added to the ink receiving layer, cracking and curl of films may be prevented. Alternatively, curl may be also prevented by adding a polymer fine particle dispersion with a high glass transition temperature to a backing layer which is a layer applied on the opposite side surface of the support with respect to the ink receiving layer, if necessary.

The thickness of the ink receiving layer is required to be selected in relation to the porosity of the layer because the layer is required to have a sufficient absorption capacity of absorbing all of the liquid drops upon ink-jet recording. For instance, when the ink amount is 8 $nL/mm^2$ and the porosity is 60%, the thickness of the layer is preferably about 15 μm or more. From this viewpoint, in the case of ink-jet recording, the thickness of the ink receiving layer is preferably from 10 μm to 50 μm.

Note that, the porosity of the ink receiving layer may be measured by using a mercury porosimeter of "PORESIZER 9320-PC2" (trade name, manufactured by Shimadzu Corp).

The ink receiving layer preferably has a high transparency. The guideline of the transparency is 30% or less, and preferably 20% or less in terms of Haze value that is measured at the time when the ink receiving layer is formed on a transparent support. The Haze value may be measured by using a Haze meter of "HGM-2DP" (trade name, manufactured by Suga Test Instruments Co., Ltd.).

(Support)

As the support that is used in the invention, any one of a transparent support made of a transparent material such as plastics and a non-transparent support made of a non-transparent material such as paper can be used. However, as the outermost layer on a side of a support made of non-transparent materials such as paper where an ink receiving layer is disposed, a resin layer including a thermoplastic resin such as polyethylene (hereinafter, in some cases, simply referred to as "thermoplastic resin-containing layer") is preferably disposed. Thermoplastic resin-containing layer can be disposed as needs arise on both sides of paper or the like.

The thermoplastic resin is not restricted to particular one and one obtained by microparticulating a known thermoplastic resin such as a polyolefin resin (for instance, a homopolymer of α-olefin such as polyethylene or polypropylene, or a mixture thereof) or a latex thereof can be appropriately selected to use. Among these, as thermoplastic resin, a polyolefin resin is preferable (particularly, polyethylene resin).

The polyolefin resin, as far as it can be extrusion-coated, is not restricted in the molecular weight thereof, and the molecular weight can be appropriately selected according to the purpose. Normally, a polyolefin resin having a molecular weight in the range of 20,000 to 200,000 is used.

As the polyethylene resin, there is no particular restriction. For instance, high-density polyethylene (HDPE), low-density polyethylene (LDPE) and linear low-density polyethylene (L-LDPE) can be cited.

In thermoplastic resin-containing layer, a white pigment, a colored pigment or a fluorescent whitening agent, or stabilizers such as phenol, bisphenol, thiobisphenol, amines, benzophenone, salicylate, benzotriazole and organometallic compounds can be preferably added.

The thermoplastic resin-containing layer may be formed by melt extrusion, wet lamination, dry lamination, or the like, but melt extrusion is preferable. When the thermoplastic resin containing layer is formed by melt extrusion, in order to have a strong adhesion between the thermoplastic resin containing layer and the support thereof (underlying layer (hereinafter, referred to as coating layer in some cases), when the support has a underlying layer, for instance), the surface of the coating layer is preferably subjected to a pretreatment. The pretreatment may include acid etching with a mixed liquid of sulfuric acid and chromic acid, flame treatment using gas flame, UV-light irradiation, corona discharging, glow discharging, and anker coating with alkyltitanate or the like, which may be appropriately selected. Considering simplicity, corona discharging is particularly preferable. Corona discharging is required to be performed in a manner that the contact angle to water becomes 70° or less.

In the support in the invention, a paper base material that is a non-transparent support can be used. The paper base material may be a natural pulp paper containing a common natural pulp as a main component; a mixed paper containing a natural pulp and a synthetic fiber; a synthetic fiber paper containing a synthetic fiber as a main component; or a simulated paper, which is produced from a synthetic resin film of such as polystyrene, polyethylene terephthalate or polypropylene. Natural pulp papers (hereinafter, referred to simply as the "base paper") are particularly preferable. The base paper may be a neutral paper (pH: 5 to 9) or an acidic paper, but is preferably a neutral paper.

As the base paper, one which has as the primary raw material natural pulp selected from conifers and broadleaf trees and to which, as needs arise, a loading material such as clay, talc, calcium carbonate, or urea resin particles; a sizing agent such as rosin, an alkyl ketene dimer, a higher fatty acid, epoxidized fatty acid amide, paraffin wax, or alkenyl succinic acid; a paper strength intensifying agent such as starch, polyamide polyamine epichlorohydrin, or polyacrylamide; and a fixing agent such as aluminum sulfate or a cationic polymer are added can be used. Furthermore, a softening agent such as a surfactant may be added thereto. Still furthermore, synthetic paper that uses synthetic pulp instead of the natural pulp may be used, or a mixture of natural pulp and synthetic pulp in an arbitrary ratio may be used. Among these, broad leaf tree pulp of short fiber and high smoothness is preferably used. The hydrature of pulp material to be used is preferably in the range of 200 mL to 500 mL/ (C.S.F.), and more preferably in the range of 300 mL to 400 mL/ (C.S.F.).

The paper base material may contain other ingredients such as a sizing agent, softening agent, paper strength additive, and fixing agent. The sizing agents include rosins, paraffin waxes, higher aliphatic acid salts, alkenyl succinate, aliphatic acid anhydrides, styrene-maleic anhydride copolymers, alkylketene dimers and epoxidized aliphatic acid amides. The softening agents include reaction products from maleic anhydride copolymers and polyalkylene polyamines and higher aliphatic acid quaternary ammonium salts. The paper strength additives include polyacrylamide, starch, polyvinyl alcohol, melamine-formaldehyde condensates and gelatin. The fixing agents include aluminum sulfate and polyamide polyamine epichlorohydrins. Additionally, as needs arise, a dye, fluorescent dye or anti-static agent may be added.

The aforementioned paper base material is preferably subjected, prior to the formation of thermoplastic resin-containing layer, to an activation treatment such as corona discharge treatment, flame treatment, glow discharge treatment or plasma treatment.

The support according to the invention can be subjected to a calender treatment.

When after a thermoplastic resin-containing layer is disposed on the paper base material, a calender treatment is applied under specific conditions, the planarity of thermoplastic resin-containing layer can be obtained, and high glossiness, high planarity and high quality image forming property of a surface of an ink receiving layer formed through thermoplastic resin-containing layer can be secured.

The calender treatment is preferably applied in such a manner that, with a soft calender or super calender at least one of a pair of rolls of which is constituted of a metal roll (preferably constituted of a metal roll and a resin roll) or both thereof, a surface temperature of the metal roll is set to a temperature equal to or higher than the glass transition temperature of thermoplastic resin and the nip pressure between a roll nip of the pair of rolls is set to 50 kg/cm to 400 kg/cm.

In what follows, a soft calender and a super calender, both having a metal roll and a resin roll, will be detailed. The metal roll, as long as it is a cylindrical or columnar roll having a smooth surface and has a heating unit inside thereof, is not particularly restricted in a material, that is, a known metal roll can be appropriately selected to use. Furthermore, the metal roll is preferably as smooth as possible in the surface roughness since the metal roll comes into contact with a recording surface side of surfaces on both sides of the support in the calender treatment, that is, a surface on a side where the ink receiving layer described below is formed. The surface roughness is specifically preferably 0.3 s or less in terms of the surface roughness stipulated by JIS B0601, and more preferably 0.2 s or less.

Furthermore, a surface temperature of the metal roll during the treatment is generally preferably in the range of 70° C. to 250° C. when the paper base material is treated. On the other hand, when the paper base material on which thermoplastic resin layer is coated is treated, the surface temperature is preferably equal to or higher than the glass transition temperature Tg of thermoplastic resin contained in thermoplastic resin-containing layer, and more preferably the Tg or higher and Tg+40° C. or lower.

The resin roll may be appropriately selected from a synthetic resin roll made of a polyurethane resin or a polyamide resin, and the shore D hardness is suitably from 60 to 90.

The nip pressure of the pair of rolls having the metal roll is appropriately from 50 to 400 kg/cm, and preferably from 100 kg/cm to 300 kg/cm. The treatment is desirably carried out substantially once or twice when a soft calender and/or super calender that is provided with a pair of rolls that are constituted as described above is used.

A support used for an ink-jet recording medium of the invention is not particularly restricted; that is, a transparent support made of a transparent material such as plastics can be used as well. As a material capable of being used in the transparent support, a material that is transparent and has the nature capable of withstanding radiation heat when used in OHP and backlight display is preferable. As such a material, for instance, polyesters such as polyethylene terephthalate (PET), polysulfone, polyphenylene oxide, polyimide, polycarbonate and polyamide can be cited. Among these, polyesters are preferable; in particular, polyethylene terephthalate is preferable.

Furthermore, with a read only optical disk such as CD-ROM or DVD-ROM, a write once optical disk such as CD-R or DVD-R or a rewritable optical disk as a support, an ink receiving layer can be imparted as well on a the label surface side.

In the present invention, the following embodiment of combination is particularly preferable: namely, in the ink, the specific water-soluble organic solvent is at least one selected from ethylene glycol monomethyl ether, ethylene glycol monoethyl ether, ethylene glycol monobutyl ether, propylene glycol monomethyl ether, propylene glycol monoethyl ether, propylene glycol monobutyl ether, ethylene glycol dimethyl ether, diethylene glycol dimethyl ether, triethylene glycol dimethyl ether, propylene glycol dimethyl ether, dipropylene glycol dimethyl ether and tripropylene glycol dimethyl ether; the content (%) of the specific water-soluble organic solvent is from 85% by mass to 100% by mass with respect to an entire amount of water-soluble organic solvent contained in the ink; and in the ink-jet recording medium, the water-soluble resin of the ink receiving layer is a polyvinyl alcohol resin and the inorganic fine particles are silica fine particles. Further in addition to that, the content ratio (p : b) of the polyvinyl alcohol resin (p) to the crosslinking agent (preferably a boron compound; b) is preferably from 100:1 to 2:1 and more preferably from 20:1 to 2.5:1.

When the ink-jet recording apparatus of the exemplary embodiment of the present invention starts operation after the roll-up body 19 of the ink-jet recording medium is loaded on the upstream side of the stage 14 in the running direction A along which the ink-jet recording medium runs, the ink-jet recording medium 13 is supplied to the stage 14 and fixed thereon. The ink-jet recording medium 13 is transferred by the stage 14 that moves at a constant speed in a sub-scanning direction perpendicular to the direction (main-scanning direction) along which the recording head 11 moves in a shuttle motion. While the ink-jet recording medium 13 is transferred, the ink is ejected from the recording head 11 onto the ink-jet recording medium in a shuttle scan mode under predetermined ejection conditions so as to record images. After ejection, the ink-jet recording medium 13 having images recorded thereon is immediately cut into a sheet and transported to the drying device 12 in which microwaves are irradiated so as to dry the ink within a predetermined period of time after ejection is finished. After drying, the ink-jet recording medium further transported is retrieved by the sheet retrieve unit 20.

EXAMPLES

The present invention will be further described in detail with reference to the following examples, but it should be construed that the invention is in no way limited to these examples as long as not departing from the scope of the present invention. Note that, unless otherwise noted, "part(s)" and "%" are on the basis of mass.

Example 1

<Preparation of Ink-Jet Recording Medium >

Preparation of Support

LBKP made from acacia in an amount of 50 parts and LBKP made from aspen in an amount of 50 parts are beaten at a canadian freeness of 300 mL respectively with a disc refiner to prepare a pulp slurry. Then, 1.3% of cation modified starch (trade name: CAT0304L, manufactured by Nippon NSC Ltd.), 0.15% of anionic polyacrylamide (trade name: DA4104, manufactured by SEIKO PMC Corp.), 0.29% of alkylketene dimer (trade name: SIZE PINE K, manufactured by Arakawa Chemical Industries, Ltd.), 0.29% of epoxidized behenic acid amide, and 0.32% of polyamidepolyamine epichlorohydrin (trade name: ARAFIX 100, manufactured by Arakawa Chemical Industries, Ltd.), with respect to pulp, are added to the pulp slurry; and then 0.12% of defoaming agent is further added.

The pulp slurry obtained as described above is subjected to paper making with a long-mesh paper machine. The resulting web is dried while the tensile stress of a dryer canvas is set to 1.6 kg/cm in a drying step in which the web is dried while the felt side thereof is pushed onto a drum dryer cylinder through the dryer canvas, then polyvinyl alcohol (trade name: KL-118, manufactured by Kuraray Co., Ltd.) is coated on both faces of the resulting body paper in an amount of 1 g/$m^2$ and the body paper is subjected to calendering. The body paper is made to have a basic weight of 166 g/$m^2$. In this way, a 160 μm thick body paper (base paper) is obtained.

After the wire side (rear face) of the resulting body paper is subjected to corona discharge treatment, a high density polyethylene is coated in a thickness of 25 g/$m^2$ with a melt extruder to form a thermoplastic resin layer with matt face. The thermoplastic resin layer formed on the rear face is further subjected to corona discharge treatment, and then a dispersion liquid in which aluminum oxide (trade name: ALUMINASIL 100, manufactured by Nissan Chemical Industries, Ltd.) and silicon dioxide (trade name: SNOWTEX O, manufacture by Nissan Chemical Industries, Ltd.), as antistatic agents, are dispersed in water in a mass ratio of 1:2 is coated in a manner that the dry amount thereof becomes 0.2 g/$m^2$. Then, the front face opposite to the rear face is subjected to corona discharge treatment, and a polyethylene that contains 10% of titanium oxide and has a density of 0.93 g/$m^2$ is coated thereon in 24 g/$m^2$ with a melt extruder.

Preparation of Coating Liquid A (First Liquid) for Ink receiving Layer Among the components of the following composition, (1) gas-phase process silica fine particles, (2) ion-exchanged water, (3) "SHALLOL DC-902P" (trade name), and (4) "ZA-30" (trade name) are mixed and dispersed with a bead mill (trade name: KD-P, manufactured by Shinmaru Enterprises Corp.), and then the resulting dispersion liquid is heated at 45° C. for 20 hours. After that, to the dispersion liquid, (5) boric acid aqueous solution, (6) polycondensate of dimethylamine, epichlorohydrin, and polyalkylene polyamine, (7) a solution dissolving polyvinyl alcohol, (8) "SUPER FLEX 650" (trade name), and (9) ethanol aqueous solution are added at 30° C. to prepared a coating liquid A (first liquid) for an ink receiving layer.

<Composition>

(1) Gas-phase process silica fine particles: 100 parts

[trade name: AEROSIL 300SF75, manufactured by Nippon Aerosil Co., Ltd]

(2) Ion-exchanged water: 555 parts, (3) "SHALLOL DC-902P": 8.7 parts

[trade name, manufactured by DAI-ICHI KYOGYO SEIYAKU CO., LTD.; dispersant, 51.5% aqueous solution]

(4) Zirconyl acetate (50% aqueous solution): 2.7 parts

[trade name: ZA-30, manufactured by Daiichi Kigenso Kagaku Kogyo Co., Ltd.]

(5) Boric acid (crosslinking agent, 7.5% aqueous solution): 50 parts, (6) Polycondensate of diemethylamine, epichlorohydrin and polyalkylene polyamine: 0.77 parts

[trade name: SC-505, manufactured by HYMO Co., Ltd.; 50% aqueous solution]

(7) A solution dissolving polyvinyl alcohol (water-soluble resin) having the following composition: 290 parts, Polyvinyl alcohol: 20.3 parts,

[trade name: "PVA-224" having a saponification degree of 88% and a polymerization degree of 2,400, manufactured by KURARYA CO., LTD.]

Diethylene glycol monobutyl ether: 6.0 parts,

[trade name: BUTYCENOL 20P, manufactured by Kyowa Hakko Kogyo Co., Ltd.], and

Ion-exchanged water: 263.7 parts.

(8) "SUPER FLEX 650": 25 parts

[trade name, manufactured by manufactured by DAI-ICHI KYOGYO SEIYAKU CO., LTD., nitrogen-containing organic cationic polymer emulsion (cationic polyurethane resin fine particles)], and (9) Ethanol aqueous solution (59% of ethanol content): 75 parts.

Preparation of Basic Solution B (Second Liquid)

The components of the following composition are mixed and agitated to prepare a basic solution B.

<Composition>

(1) Boric acid: 0.65 part, (2) Zirconyl ammonium carbonate: 2.5 parts,

[trade name: ZIRCOSOL AC-7, manufactured by Daiichi Kigenso Kagaku Kogyo Co., Ltd.; 13% aqueous solution]

(3) Ammonium carbonate: 4.0 parts,

[first grade, manufactured by Kanto Chemical Co., Ltd.]

(4) Ion-exchanged water: 92.85 parts, and (5) Polyoxyethylene isodecyl ether: 0.6 part.

[trade name: NOYGEN SD-70, manufactured by DAI-ICHI KYOGYO SEIYAKU CO., LTD.]

Preparation of Polyvalent Metal Salt Aqueous Solution C for In-Line Blending

The components of the following composition are mixed and agitated to prepare a polyvalent metal salt aqueous solution C for in-line blending.

<Composition>

(1) "ALFINE 83": 20.0 parts,

[trade name, manufactured by Taimei Chemicals Co., Ltd.; polyaluminum chloride]

(2) "NOYGEN SD-60": 4.4 parts,

[trade name, manufactured by DAI-ICHI KYOGYO SEIYAKU CO., LTD.; polyoxyethylene isodecyl ether], and (3) Ion-exchanged water: 75.6 parts.

Preparation of Ink-jet Recording Paper

After the front face of the support is subjected to corona discharge treatment, the polyvalent metal salt aqueous solution C is inline-mixed at a rate of 10.8 mL/$m^2$ with the coating liquid A (first liquid) for an ink receiving layer supplied at a coating rate of 173 mL/$m^2$ to prepare a coating liquid for an ink receiving layer, which is then coated on the front face. After that, the support with the resulting coating layer is dried at 80° C. in a hot air oven (from 3 m/second to 8 m/second of air velocity) until the solid content of the coating layer becomes 20%. The coating layer exhibits constant-rate drying in this period. Before decreasing drying appears, the support is immersed in the basic solution B (second liquid) for 3 seconds to adhere it in an amount of 13 g/$m^2$ onto the coating layer, and then further dried at 80° C. for 10 minutes.

In this way, rolled ink-jet recording paper having on a support an ink recording layer with a dry thickness of 32 μm is obtained. The rolled ink-jet recording paper is subjected to slit processing to obtain rolls of 152 mm width×100 m, which are used as a sample roll for evaluation.

The particle diameter of the inorganic fine particles contained in the ink receiving layer that is measured by the method described below is 20 nm.

<Production of Ink>

Deionized water was added to a component having the following composition 1 to reach 1 L, and then the resultant was stirred for 1 hour while heating at 30° C. to 40° C. Thereafter, the pH was adjusted to 9 by 10 mol/L KOH, and filtration under reduced pressure was performed using a micro filter having an average pore diameter of 0.25 μm, thereby preparing a magenta ink M-101.

<Ink Composition 1>

The dye M-1 described below: 35.0 g,
1,5-Pentanediol: 50.0 g,
2-Pyrrolidone: 50.0 g,
Ethylene glycol monomethyl ether (EGMME): 72.4 g,
Urea: 19.0 g, and
"PROXEL XL2" (trade name, manufactured by Avecia Ltd.): 1.1 g.

Compound M-1

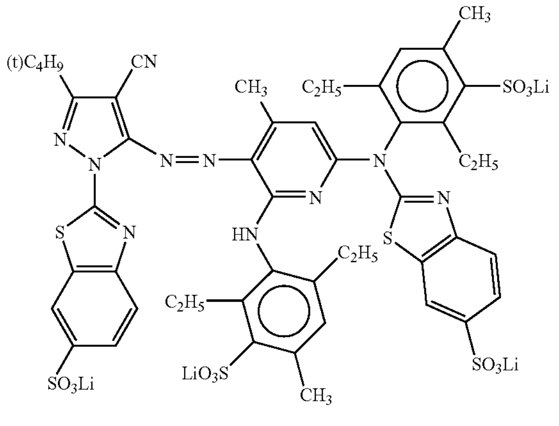

Image Recording and Evaluation

Image recording and evaluation are carried out by recording images with a magenta ink M-101 on the ink-jet recording sheet obtained as above. The evaluation results are shown in the Table 1 described below.

1. Image Recording

As an ink-jet printer, an apparatus shown in FIG. 1 is prepared. The ink-jet printer has a 1200 dpi head (manufactured by FUJIFILM Dimatrix, Inc.) that serves as the recording head 11 (ink-jet head). The ink reservoir tank connected to the head is refilled with the above obtained magenta ink M-101. The recording head 11 is allowed to make a repetitive motion in a shuttle scan mode on a horizontal face in a direction (forward and backward direction in FIG. 1) perpendicular to the running direction A (arrowed direction A) of the recording paper shown in FIG. 1, and to eject an ink so as to record images.

In the ejection direction of the ink ejecting outlet of the recording head 11, the stage 14 that has a function of sucking is equipped, so that the ink-jet recording paper 13 is allowed to move between the recording head 11 and the stage 14. The stage 14 fixes temporarily the transported ink-jet recording paper 13 by sucking and adhering and is allowed to move linearly in a horizontal direction at a speed of 10 mm/sec, so that the landing position of ink drops ejected from the recording head 11 may be selected by the movement of the stage. On the upstream side of the stage 14 in the running direction A along which the recording paper runs, the roll body 19 of the ink-jet recording paper is loaded as shown in FIG. 1, so that a long strip of the ink-jet recording paper is supplied from the roll body to the stage at a predetermined speed. On the downstream side of the stage 14 in the running direction A of the recording paper, plural pairs of movable rollers 15 are disposed along the running passage thereof, and between the pairs of the rollers the cutter 18 for cutting the ink-jet recording paper and the drying device 12 having "ESG-2450S-2A" (trade name, microwave generator, manufactured by SPC ELECTRONICS CORP.) and a drying fan (3 $m^3$/minute of airflow rate, 25° C. of air temperature) are disposed. After images are recorded on the ink-jet recording paper, the paper is immediately cut into a desired size and transported to the drying device 12, which is configured in a manner that microwaves are irradiated on the surface of images and the air blows. After drying, the sheet-form ink-jet recording paper having images recorded thereon is transported to the sheet retrieve unit 20 that is disposed on still further downstream side, and then stacked and retrieved with the sheet retrieve unit 20.

Note that, on the opposite position to the drying device across the running passage of the ink-jet recording paper, as shown in FIG. 1, a recording device (for example, ink-jet head or the like) may be disposed for the purpose of printing the rear face (rear face printing) of the ink-jet recording paper, wherein the rear face has no ink receiving layer, so that rear face recording may be simultaneously performed.

When the ink-jet printer starts operation after the roll body of the ink-jet recording paper prepared in a roll form is loaded, the ink-jet recording paper 13 is supplied to the stage 14 and fixed thereon. While the ink-jet recording paper 13, as it is fixed, is moved at a constant speed in the sub-scanning direction, the magenta ink M-101 is ejected from the recording head in a shuttle scan mode to record a magenta color solid image under the following ejection conditions: 2 pL of ink drop amount, 20 mL/$m^2$ of maximum total ejection amount, 30 kHz of ejection frequency, and 1200 dpi×1200 dpi of resolution. The head speed is 635 mm/second. The gradation of the image data is regulated to adjust the magenta density at 1.5, wherein the magenta density is measured with "GRETAG SPECTROLINO SPM-50" (trade name, manufactured by GretagMacbeth Corp.; 2° of view angle, D50 of light source, without filter).

After ejection, the recording paper is immediately cut into a sheet and transported to the drying device 12. Five seconds later after ejection is finished, microwaves (2450 MHz of oscillation frequency, 100 W of output power) are irradiated for 3.6 seconds (at a paper transporting speed of 28 mm/second) so as to dry the recording paper. Dry air 25° C. is also supplied in this process. The heat quantity per unit area of the ink recording layer upon drying is 360 J/KG size (102 mm×152 mm). After drying is finished, the ink-jet recording paper having a solid image recorded thereon is still further transported and retrieved with the sheet retrieve unit 20.

In this way, a magenta color image is obtained on the ink-jet recording paper.

2. Measurement of Micropore Median Size of Ink Receiving Layer

An aqueous solution obtained by diluting a water-soluble organic solvent (see Table 1 below) with water is coated on the surface of the ink receiving layer of the ink-jet recording paper with a bar coater in a manner that the coating amount of the water-soluble organic solvent becomes 6.6 $g/m^2$.

The ink-jet recording paper after coating and the ink-jet recording paper before coating are each cut into a sheet of 20 mm×100 mm in size to obtain test samples, which are left in an atmosphere at 25° C. and 50% RH for 24 hours. After that, the micropore size distribution (L2: micropore median size before coating, L3: micropore median size after coating) is measured at an initial atmospheric pressure of 20 kPa by using a "9220" porosimeter (trade name, manufactured by Shimadzu Autopore Corp.). In addition, the micropore size distribution (L1: micropore median size of the support) of a support having no ink receiving layer is also measured, similarly.

Then, from the resulting measured values, in accordance with the following equation, the rate of change (%) in the micropore median size in the ink receiving layer is obtained. The obtained results are shown in Table 1 below.

$$\text{Rate of change (\%) in micropore median size in ink receiving layer}=[(L3-L1)/(L2-L1)]\times100-100$$

3. Measurement of Particle Size of Inorganic Fine Particles in Ink Receiving Layer The surface of the ink receiving layer is observed using an electron microscope (trade name: Hitachi high resolution field emission scanning electron microscope S-470, manufactured by Hitachi High-Technologies Corp.) at an acceleration voltage of 10 kV. Projection areas for each of 100 inorganic fine particles picked up arbitrarily on the surface are evaluated. The diameter of a virtual circle having the same area as the projection area is regarded as the particle size of each particle, and the particle size of the inorganic particles is determined as a simple average of the diameters for 100 inorganic particles.

4. Evaluation of Color tone Change (Color Change)

L*a*b* is measured on the magenta color solid image immediately after retrieving (within 3 minutes after drying is finished) and 24 hours later after retrieving with a spectrophotometer of "SPECTROLINO" (trade name, manufactured by GretagMacbeth Corp.) under the conditions of 2° of view angle, F8 of light source, and without filter. Hue difference ($\Delta E$) is obtained from each measured value and is used as an index for evaluation of color tone change. Evaluation is made based on thus obtained values of hue difference in accordance with the following evaluation criteria. Note that, in the evaluation, an ink-jet recording paper that is preliminary left in an atmosphere of 25° C. and 50% RH for 1 day is used and a magenta color solid image is recorded on the ink receiving layer of the paper in the same atmosphere. The evaluation results are shown in the following Table 1.

<Evaluation Criteria>

AA: $\Delta E<2$; color tone change is almost not recognized.

A: $2\leqq\Delta E<4$; color tone change is recognized, but is not so remarkable.

B: $4\leqq\Delta E<7$; color tone change is fairly remarkable.

C: $\Delta E\geqq7$; color tone change is marked.

5. Evaluation of Image Density

After the above obtained ink-jet recording paper is left in an atmosphere of 25° C. and 50% RH for 1 day, a magenta color solid image is printed on the ink receiving layer in the same atmosphere and in a similar manner except that the color adjustment is set to be a no color correction mode, and then left for 24 hours in the same atmosphere. After that, the magenta color density is measured with "X-RITE 310" (trade name, manufactured by X-rite Corp.) and is evaluated in accordance with the following criteria. The evaluation results are shown in the following Table 1.

<Evaluation Criteria>

AA: Density is 2.6 or more.

A: Density is 2.5 or more but less than 2.6.

B: Density is 2.4 or more but less than 2.5.

C: Density is less than 2.4.

6. Evaluation of Continuous Recording Performance

KG size images are printed similarly to the foregoing section of "1. Image Recording" continuously, the resulting continuously printed solid images are subjected to visual observation and are evaluated in accordance with the following evaluation criteria.

<Evaluation Criteria>

AA: Good images without dot loss are obtained even after continuous printing of 200,000 sheets.

A: Good images without dot loss are obtained even after continuous printing of 100,000 sheets.

B: Dot loss starts to develop after continuous printing of 10,000 sheets.

C: Dot loss starts to develop after continuous printing of 5,000 sheets, which is not acceptable for practical use.

7. Evaluation of Productivity

KG size images are printed continuously and the resulting images are evaluated in accordance with the following criteria.

<Evaluation Criteria>

A: 500 sheet/hour or more of image printing speed is attainable.

C: Only less than 500 sheet/hour of image printing speed is attained.

Example 2

An ink-jet recording paper is obtained and image recording and evaluation are carried out in a manner substantially similarly to that in Example 1, except that, in Example 1, "ESG-2450S-2A" (trade name, manufactured by SPC ELECTRONICS CORP.; microwave generator) is replaced by "H7G-21200" (trade name, manufactured by NGK Insulators, Ltd.; infrared ray irradiator, 200 W, 20.4 seconds of irradiation time).

Examples 3 to 9, Comparative Example 1

Image recording and evaluation are carried out in a manner substantially similarly to that in Example 1, except that, in Example 1, ethylene glycol monomethyl ether in the ink composition 1 of the magenta color ink M-101 is replaced by each water-soluble organic solvent shown in the following Table 1.

Example 10

An ink-jet recording paper is obtained and image recording and evaluation are carried out in a manner substantially similarly to that in Example 1, except that, in Example 1, "ESG-2450S-2A" (trade name, microwave generator, SPC ELEC- TRONICS CORP.) is replaced by a nichrome wire hot air heater (400 W, 2 seconds of heating time) and that 60° C. hot air is sent by a drying fan (3 $m^3$/minute of airflow rate).

Comparative Example 2

An ink-jet recording paper is obtained and image recording and evaluation are carried out in a manner substantially similarly to that in Example 1, except that, in Comparative Example 1, "ESG-2450S-2A" (trade name, microwave generator, SPC ELECTRONICS CORP.) is replaced by a nichrome wire hot air heater (400 W, 2 seconds of heating time) and that 60° C. hot air is sent by a drying fan (3 $m^3$/minute of airflow rate).

Comparative Example 3

An ink-jet recording paper is obtained and image recording and evaluation are carried out in a manner substantially similarly to that in Comparative Example 2, except that, in Comparative Example 2, the time from the end of ejection to the start of microwave irradiation is changed from 5 seconds to 10 seconds.

Comparative Example 4

An ink-jet recording paper is obtained and image recording and evaluation are carried out in a manner substantially similarly to that in Example 8, except that, in Example 8, the content of the water-soluble organic solvent in the magenta color ink M-101 is changed from 42% by mass to 29% by mass.

As shown in Table 1, in Examples, color change after recording may be suppressed, continuous recording may be performed adequately, and the productivity may be kept high. As opposed to this, in Comparative Examples, color change is not suppressed. When the time from the end of extrusion to the start of heating is extended, color change may be improved, but continuous recording performance becomes poor and productivity is also lowered.

According to the present invention, indifferent to the mode of recording, for instance, double-sided recording, high-volume recording, or high-speed recording, an ink-jet recording apparatus and an ink-jet recording method capable of producing images in which density is high and hue difference (color change) is suppressed may be provided.

The present invention may namely provide the following items <1> to <17>:

<1> An ink-jet recording apparatus, including: a transporting device transporting an ink-jet recording medium having on a support an ink receiving layer that comprises inorganic fine particles, a water-soluble resin, and a crosslinking agent; an ink ejection device ejecting onto the ink recording medium an ink that comprises a dye, water, and a water-soluble organic solvent, the water-soluble organic solvent having a rate of change in micropore median size of 13.0% or less in the ink receiving layer as measured by the mercury intrusion method before and after the ink is applied onto the ink receiving layer in an amount of 6.6 $g/m^2$ and being contained in a ratio of at least 40% by mass with respect to an entire amount of water-soluble organic solvent; and a drying device drying at least the ink on the ink-jet recording medium.

TABLE 1

| | Ink | | | | | Measurement and Evaluation | | | | | |
|---|---|---|---|---|---|---|---|---|---|---|---|
| | Water-soluble organic solvent | Content (% by mass) | Drying | Heat quantity (J) | Time until heating (sec) | Rate of change in median size (%) | Particle size (nm) | Color change | Density | Continuous recording | Productivity |
| Example 1 | EGMME | 42 | Microwaves | 360 | 5 | 5.4 | 20 | A | AA | A | A |
| Example 2 | EGMME | 42 | Infrared rays | 480 | 5 | 5.4 | 20 | A | AA | A | A |
| Example 3 | EGDME | 42 | Microwaves | 360 | 5 | 5.1 | 20 | A | AA | A | A |
| Example 4 | DEGDME | 42 | Microwaves | 360 | 5 | 7.5 | 20 | A | A | A | A |
| Example 5 | TEGDME | 42 | Microwaves | 360 | 5 | 5.7 | 20 | A | AA | A | A |
| Example 6 | PGDME | 42 | Microwaves | 360 | 5 | 5.3 | 20 | A | AA | A | A |
| Example 7 | DPGDME | 42 | Microwaves | 360 | 5 | 7.4 | 20 | A | A | A | A |
| Example 8 | DEGMBE | 42 | Microwaves | 360 | 5 | 7.3 | 20 | A | A | A | A |
| Example 9 | PD | 42 | Microwaves | 360 | 5 | 7.7 | 20 | A | A | A | A |
| Example 10 | EGMME | 42 | Hot air | 800 | 5 | 5.4 | 20 | A | A | B | A |
| Comparative Example 1 | TEGMBE | 42 | Microwaves | 360 | 5 | 13.8 | 20 | C | B | A | A |
| Comparative Example 2 | TEGMBE | 42 | Hot air | 800 | 5 | 13.8 | 20 | B | B | C | A |
| Comparative Example 3 | TEGMBE | 42 | Hot air | 800 | 10 | 13.8 | 20 | A | B | A | C |
| Comparative Example 4 | DEGMBE | 29 | Microwaves | 360 | 5 | 7.3 | 20 | C | B | A | A |

Abbreviates in the columns of the water-soluble organic solvent in the Table 1 denote as follows;

EGDME: ethylene glycol dimethyl ether

DEGDME: diethylene glycol dimethyl ether

TEGDME: triethylene glycol dimethyl ether

PGDME: propylene glycol dimethyl ether

DPGDME: dipropylene glycol dimethyl ether

DEGMBE: diethylene glycol monobutyl ether

PD: 1,2-propanediol

TEGMBE: triethylene glycol monobutyl ether

<2> The ink-jet recording apparatus according to the item <1>, wherein the drying device has an infrared ray irradiation unit and heats at least the ink with infrared rays.

<3> The ink-jet recording apparatus according to the item <1>, wherein the drying device has a microwave irradiation unit and heats at least the ink with microwaves.

<4> The ink-jet recording apparatus according to any one of the items <1> to <3>, wherein the water-soluble organic solvent contained in the ink is at least one selected from the group consisting of ethylene glycol monoalkyl ether, diethylene glycol monoalkyl ether, propylene glycol monoalkyl ether, dipropylene glycol monoalkyl ether, alkanediol, ethylene glycol dialkyl ether, diethylene glycol dialkyl ether, triethylene glycol dialkyl ether, propylene glycol dialkyl ether, dipropylene glycol dialkyl ether, and tripropylene glycol dialkyl ether.

<5> The ink-jet recording apparatus according to any one of the items <1> to <4>, wherein the drying device starts drying within 20 seconds after ink ejection from the ink ejection device is finished.

<6> The ink-jet recording apparatus according to any one of the items <1> to <5>, wherein the ink ejection device ejects the ink at a maximum total ejection amount of from 10 $mL/m^2$ to 36 $mL/m^2$.

<7> The ink-jet recording apparatus according to any one of the items <1> to <6>, wherein the drying device provides a heat quantity of 2 kJ or less per 102 mm×152 mm.

<8> The ink-jet recording apparatus according to any one of the items <1> to <7>, wherein the dye is a water-soluble dye.

<9> An ink-jet recording method, including: transporting an ink-jet recording medium having on a support an ink receiving layer that comprises inorganic fine particles, a water-soluble resin, and a crosslinking agent; ejecting onto the transported ink-jet recording medium an ink that comprises a dye, water, and a water-soluble organic solvent, the water-soluble organic solvent having a rate of change in micropore median size of 13.0% or less in the ink receiving layer as measured by the mercury intrusion method before and after the ink is applied onto the ink receiving layer in an amount of 6.6 $g/m^2$ and being contained in a ratio of at least 40% by mass with respect to an entire amount of water-soluble organic solvent by an ink-jet method; and drying at least the ink on the ink-jet recording medium.

<10> The ink-jet recording method according to the item <9>, wherein the drying provides a heat quantity of 2 kJ or less per 102 mm×152 mm.

<11> The ink-jet recording method according to the item <9> or the item <10>, wherein the drying is performed by heating with infrared rays.

<12> The ink-jet recording method according to the item <9> or the item <10>, wherein the drying is performed by heating with microwaves.

<13> The ink-jet recording method according to any one of the items <9> to <12>, wherein the drying starts within 20 seconds after the ink ejection is finished.

<14> The ink-jet recording method according to any one of the items <9> to <13>, wherein the ink is ejected at a maximum total ejection amount of from 10 $mL/m^2$ to 36 $mL/m^2$.

<15> The ink-jet recording method according to any one of the items <9> to <14>, wherein the water-soluble organic solvent contained in the ink is at least one selected from the group consisting of ethylene glycol monoalkyl ether, diethylene glycol monoalkyl ether, propylene glycol monoalkyl ether, dipropylene glycol monoalkyl ether, alkanediol, ethylene glycol dialkyl ether, diethylene glycol dialkyl ether, triethylene glycol dialkyl ether, propylene glycol dialkyl ether, dipropylene glycol dialkyl ether, and tripropylene glycol dialkyl ether.

<16> The ink-jet recording method according to any one of the items <9> to <15>, wherein the ink is a dye-based ink that comprises a dye as a colorant.

<17> The ink-jet recording method according to any one of the items <9> to <16>, wherein the dye is a water-soluble dye.

The foregoing description of the exemplary embodiments of the present invention has been provided for the purposes of illustration and description. It is not intended to be exhaustive or to limit the invention to the precise forms disclosed. The embodiments were chosen and described in order to best explain the principles of the invention and its practical applications, thereby enabling others skilled in the art to understand the invention for various embodiments and with the various modifications as are suited to the particular use contemplated.

All publications, patent applications, and technical standards mentioned in this specification are herein incorporated by reference to the same extent as if such individual publication, patent application, or technical standard was specifically and individually indicated to be incorporated by reference. It will be obvious to those having skill in the art that many changes may be made in the above-described details of the preferred embodiments of the present invention. It is intended that the scope of the invention be defined by the following claims and their equivalents.

What is claimed is:

1. An ink-jet recording apparatus comprising:

a transporting device transporting an ink-jet recording medium having on a support an ink receiving layer that comprises inorganic fine particles, a water-soluble resin, and a crosslinking agent;

an ink ejection device ejecting onto the ink-jet recording medium an ink that comprises a dye, water, and a water-soluble organic solvent, the water-soluble organic solvent having a rate of change in micropore median size in the ink receiving layer of 13.0% or less as measured by the mercury intrusion method before and after the ink is applied onto the ink receiving layer in an amount of 6.6 $g/m^2$ and being contained in a ratio of at least 40% by mass with respect to an entire amount of water-soluble organic solvent; and a drying device drying at least the ink on the ink-jet recording medium.

2. The ink-jet recording apparatus according to claim 1, wherein the drying device has an infrared ray irradiation unit and heats at least the ink with infrared rays.

3. The ink-jet recording apparatus according to claim 1, wherein the drying device has a microwave irradiation unit and heats at least the ink with microwaves.

4. The ink-jet recording apparatus according to claim 1, wherein the water-soluble organic solvent contained in the ink is at least one selected from the group consisting of ethylene glycol monoalkyl ether, diethylene glycol monoalkyl ether, propylene glycol monoalkyl ether, dipropylene glycol monoalkyl ether, alkanediol, ethylene glycol dialkyl ether, diethylene glycol dialkyl ether, triethylene glycol dialkyl ether, propylene glycol dialkyl ether, dipropylene glycol dialkyl ether, and tripropylene glycol dialkyl ether.

5. The ink-jet recording apparatus according to claim 1, wherein the drying device starts drying within 20 seconds after ink ejection from the ink ejection device is finished.

6. The ink-jet recording apparatus according to claim 1, wherein the ink ejection device ejects the ink at a maximum total ejection amount of from 10 $mL/m^2$ to 36 $mL/m^2$.

7. The ink-jet recording apparatus according to claim 1, wherein the drying device provides a heat quantity of 2 kJ or less per 102 mm×152 mm.

8. The ink-jet recording apparatus according to claim 1, wherein the dye is a water-soluble dye.

9. An ink-jet recording method comprising:

transporting an ink-jet recording medium having on a support an ink receiving layer that comprises inorganic fine particles, a water-soluble resin, and a crosslinking agent;

ejecting onto the transported ink-jet recording medium an ink that comprises a dye, water, and a water-soluble organic solvent, the water-soluble organic solvent having a rate of change in micropore median size of 13.0% or less in the ink receiving layer as measured by the mercury intrusion method before and after the ink is applied onto the ink receiving layer in an amount of 6.6 $g/m^2$ and being contained in a ratio of at least 40% by mass with respect to an entire amount of water-soluble organic solvent by an ink-jet method; and drying at least the ink on the ink-jet recording medium.

10. The ink-jet recording method according to claim 9, wherein the drying provides a heat quantity of 2 kJ or less per 102 mm×152 mm.

11. The ink-jet recording method according to claim 9, wherein the drying is performed by heating with infrared rays.

12. The ink-jet recording method according to claim 9, wherein the drying is performed by heating with microwaves.

13. The ink-jet recording method according to claim 9, wherein the drying starts within 20 seconds after the ink ejection is finished.

14. The ink-jet recording method according to claim 9, wherein the ink is ejected at a maximum total ejection amount of from 10 $mL/m^2$ to 36 $mL/m^2$.

15. The ink-jet recording method according to claim 9, wherein the water-soluble organic solvent contained in the ink is at least one selected from the group consisting of ethylene glycol monoalkyl ether, diethylene glycol monoalkyl ether, propylene glycol monoalkyl ether, dipropylene glycol monoalkyl ether, alkanediol, ethylene glycol dialkyl ether, diethylene glycol dialkyl ether, triethylene glycol dialkyl ether, propylene glycol dialkyl ether, dipropylene glycol dialkyl ether, and tripropylene glycol dialkyl ether.

16. The ink-jet recording method according to claim 9, wherein the ink is a dye-based ink that comprises a dye as a colorant.

17. The ink-jet recording method according to claim 9, wherein the dye is a water-soluble dye.

* * * * *